United States Patent [19]

Miyazaki et al.

[11] Patent Number: 6,084,687
[45] Date of Patent: Jul. 4, 2000

[54] IMAGE PROCESSING SYSTEM, DRAWING SYSTEM, DRAWING METHOD, MEDIUM, PRINTER, AND IMAGE DISPLAY UNIT

[75] Inventors: Koichi Miyazaki; Masateru Hattori, both of Ebina, Japan

[73] Assignee: Fuji Xerox Co., Ltd., Tokyo, Japan

[21] Appl. No.: 09/043,000

[22] Filed: Mar. 17, 1998

Related U.S. Application Data

[63] Continuation-in-part of application No. 08/989,662, Dec. 12, 1997.

[30] Foreign Application Priority Data

Dec. 25, 1996 [JP] Japan .................................... 8-346182
Mar. 19, 1997 [JP] Japan .................................... 9-066957

[51] Int. Cl.$^7$ .................................................. B41B 15/00
[52] U.S. Cl. ...................... 358/1.17; 358/1.17; 358/1.15; 358/1; 358/1.1; 358/1.13
[58] Field of Search ................................ 358/1.17, 1.15, 358/1.1, 1.13

[56] References Cited

U.S. PATENT DOCUMENTS 5,050,100  9/1991  Damon et al. ............................ 364/514
5,602,976  2/1997  Cooper et al. .

FOREIGN PATENT DOCUMENTS 63-21158   1/1988   Japan .
4-9338     2/1992   Japan .
6-290007  10/1994   Japan .

*Primary Examiner*—Edward L. Coles
*Assistant Examiner*—Twyler Lamb
*Attorney, Agent, or Firm*—Oliff & Berridge, PLC

[57] ABSTRACT

An image processing system which comprises number-of-divisions determination means, conversion means, an intermediate buffer, selection means, expansion means, and a band memory, characterized by separation means for separating the intermediate code into proper information and attribute information, attribute determination means for determining whether or not the attributes of the preceding attribute information differ from the attributes of the subsequent attribute information, control means for storing the subsequent attribute information in the intermediate buffer if the attribute determination means determines that the attributes of the preceding attribute information differ from the attributes of the subsequent attribute information, restoration means for restoring the subsequent attribute information using the preceding attribute information code when the intermediate code is output from the intermediate buffer to the expansion means, and area information addition means for adding area information indicating which band the code is valid on to the proper information and attribute information of the intermediate code.

29 Claims, 20 Drawing Sheets

(TO FIG. 5 ✻)

```
/Times-Roman    findfont
15    scalefont    setfont
100    200    moveto
( a b c _ e f )
    ⋮
show page
```

| CHARACTER CODE | a | b | c | d | e | f |
|---|---|---|---|---|---|---|
| POSITION | (xa, ya) | (xb, yb) | (xc, yc) | (xd, yd) | (xe, ye) | (xf, yf) |
| FONT | TIMES-ROMAN | ← | ← | ELITE | TIMES-ROMAN | ← |
| SIZE | 12 PT | ← | ← | 18 PT | 12 PT | ← |
| QUALIFICATION | NONE | ← | ← | ← | ← | ← |

| NO QUALIFICATION |
|---|
| TIMES - ROMAN |
| 12PT |
| a (xa, ya) |
| b (xb, yb) |
| c (xc, yc) |
| ELITE |
| 18PT |
| d (xd, yd) |
| TIMES - ROMAN |
| 12PT |
| e (xe, ye) |
| f (xf, yf) |

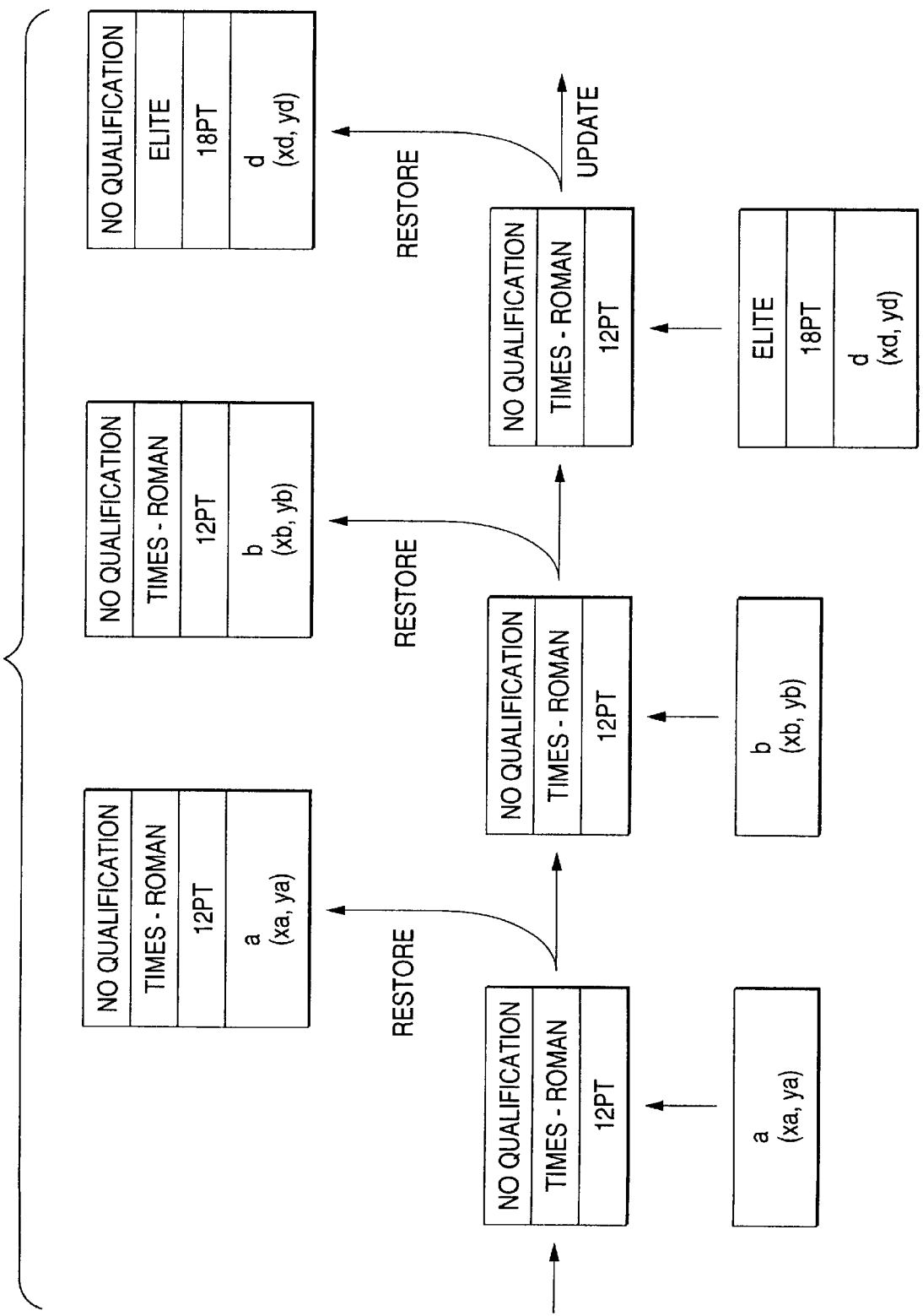

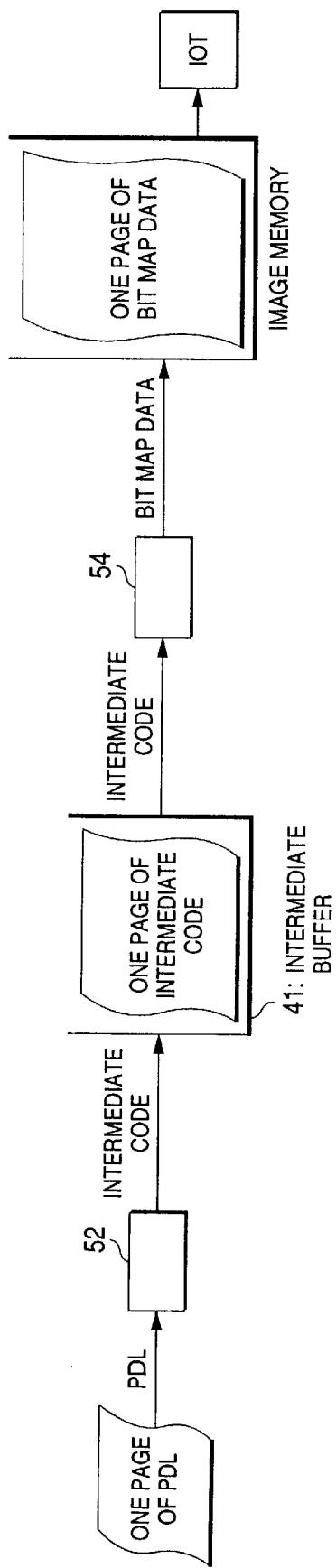
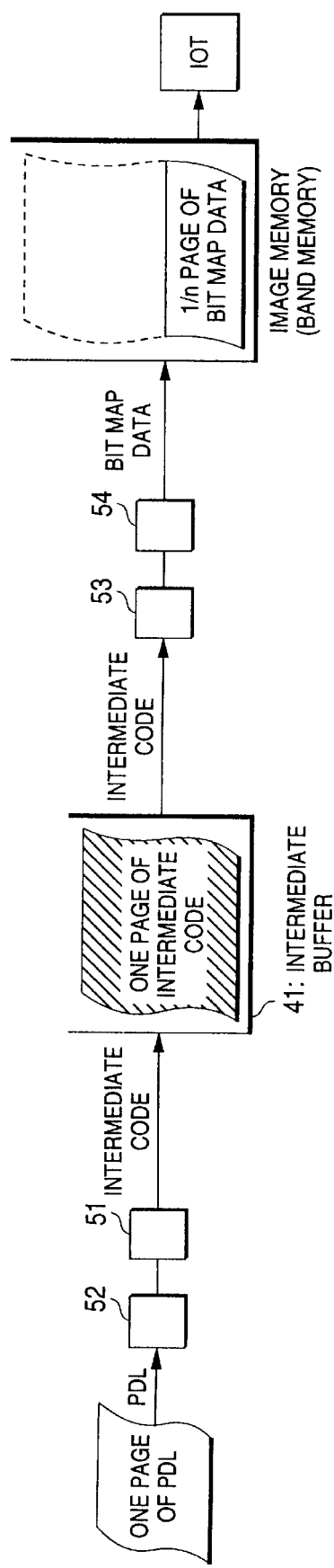
FIG. 13A
FIG. 13B

IMAGE PROCESSING SYSTEM, DRAWING SYSTEM, DRAWING METHOD, MEDIUM, PRINTER, AND IMAGE DISPLAY UNIT

This is a Continuation-in-Part of application Ser. No. 08/989,662 filed Dec. 12, 1997. The entire disclosure of the prior application is hereby incorporated by reference herein in its entirety.

BACKGROUND OF THE INVENTION

This invention relates to an image processing system for dividing one page into areas, which will be hereinafter referred to as "bands," and performing image processing in sequence in band units.

A sequence of data input to image formation in a conventional printer will be discussed with reference to FIG. 13A. First, when one page of page description language (PDL) data is input from a personal computer, a workstation, etc., through various interfaces to an image processing system, the PDL is interpreted in instruction contents and is converted into intermediate code by conversion means 52 and the intermediate code is once stored in an intermediate buffer 41. The intermediate code stored in the intermediate buffer 41 is expanded to bit map data in sequence by expansion means 54 and the bit map data is stored in an image memory. When 1-page bit map data is thus complete, the bit map data is output to an image output terminal (IOT) and an image is formed on recording paper.

The features of the PDL, bit map data, and intermediate code depending on the data format difference among them are as follows: As shown in FIG. 14, the PDL has the smallest information amount, the bit map data has the largest information amount, and the intermediate code has an information amount between the PDL and bit map data information amounts. Therefore, the PDL has the smallest memory occupation amount and the bit map data has the largest memory occupation amount. In contrast, the time required for converting the intermediate code into the bit map data is shorter than the time required for converting the PDL into the bit map data. This means that the load imposed on the CPU when the PDL is expanded to the bit map data is larger than that when the intermediate code is expanded to the bit map data. The features are two sides of the same coin and the feature differences are used to shorten the data transfer time and realize smooth image formation.

Further, the memory capacity installed in the printer should be minimized from the aspect of costs. From this viewpoint, also proposed is a system which divides intermediate code into which PDL is converted by conversion means 52 into N bands by number-of-divisions determination means 51, selects the intermediate code for each of the N bands in sequence by selection means 53, expands the intermediate code to bit map data by expansion means 54, and outputs the bit map data to IOT for forming an image on recording paper. This system eliminates the need for the image memory for storing 1-page bit map data and may comprise an image memory for storing bit map data of about one-Nth of one page, which will be hereinafter referred to as band memory 6, enabling memory saving. Such a function is called banding function.

However, if it takes time in expanding the intermediate code to the bit map data and output of the bit map data to the print engine is delayed, it takes time in forming an image and image defects occur in response to the printer type because 1-page bit map data cannot be stored in the printer. That is, for an ink jet printer, etc., if bit map data supply is temporarily stopped during the image formation, this accident prolongs the time required for the image formation. However, the image formation itself does not involve a large problem. On the other hand, for an electrophotographic printer such as a laser printer, a photosensitive body rotates at a given speed during the image formation, thus once 1-page image formation is started, stopping of bit map data supply during the image formation immediately leads to an image lack.

To provide the banding function with no problem for the printer where stopping of bit map data supply during the image formation is not allowed, if the capability of the expansion means is constant (the CPU power is constant), the intermediate code can be set to low-level intermediate code whose expansion does not take much time (in FIG. 14, level close to the bit map data). However, the expansion time of the intermediate code to the bit map data and the information amount (memory occupation amount) of the intermediate code are both sides of the same coin as described above; if low-level intermediate code is prepared, the image lack problem can be circumvented undoubtedly, but it becomes necessary to provide a large-capacity intermediate buffer. This ignores the original purpose of the banding function to lessen the image memory for memory saving. The demand for smooth image formation with no image lack, etc., with limited CPU power and installed memory capacity is a very important problem in the printer.

By the way, nowadays, a so-called complex machine provided with digital copy, printer, and facsimile functions is known. Such a complex machine comprises an image memory of at least one page so as to function as a digital copy unit. To provide the banding function for the complex machine, even if it takes time in expanding intermediate code, if image formation is executed after 1-page bit map data is stored in the image memory, an image lack, etc., does not occur.

A printer rather than the complex machine is also proposed for furthermore compressing bands expanded to bit map data and storing compressed 1-page bit map data, then while decompressing the compressed data, outputting the decompressed data to an IOT. This decompressing enables real-time image formation.

The complex machine or the printer compressing and storing bit map data in band units can output bit map data of a 1-page image to the printer engine with no delay, thus ensures smooth image formation with no image lack, etc. Thus, installed memory saving can be considered primarily between directly-opposed demands for installed memory saving and smooth image formation with no image lack, etc., required for the printer.

Therefore, in the complex machine and the printer compressing and storing bit map data in band units, information amount saving is first needed as intermediate code. To provide the banding function, some mechanism is required for establishing correspondence between the intermediate code corresponding to objects of characters (text), graphic forms, etc., and bands to which the objects belong; it is also desirable to easily establish the correspondence.

From such viewpoints, for saving the information amount of intermediate code, an art of forming the intermediate code at a level close to the PDL as much as possible, namely, at the upper level in FIG. 14 is disclosed in the Unexamined Japanese Patent Application Publication No. Hei 4-009338. In this art, graphic form data is converted into intermediate code in parameter format (for example, the center coordinates and radius for a circle or representative point coordinates and vector information for a line graphic form) for saving the intermediate buffer capacity.

For the mechanism for establishing correspondence between the intermediate code and bands to which the characters (text), graphic forms, etc., represented by the intermediate code belong, an art of checking intermediate code stored in an intermediate buffer and selecting in a range check circuit each time drawing is executed in band units is disclosed in the Unexamined Japanese Patent Application Publication No. Hei 4-009338 mentioned above. Further, disclosed in the Unexamined Japanese Patent Application Publication No. Sho 63-021158 is an art of previously scanning intermediate code in an intermediate buffer and preparing band map information indicating which band each intermediate code belongs, which will be hereinafter referred to as area information, apart from the intermediate buffer.

Although elements of intermediate code representing objects of characters (text), graphic forms, etc., include elements proper to the object and those common to objects, the proper elements and the common elements are not distinguished in handling in the art described in the Unexamined Japanese Patent Application Publication No. Hei 4-009338 concerning saving of the intermediate code information amount, thus each intermediate code contains elements common to other intermediate codes, resulting in an increase in the information amount. For example, to output 1000 12-point characters, 1000 intermediate code elements of "12 points" become necessary in total for the 1000 characters. Considering that character size, font, and the like are not frequently changed in normal document image formation, fairly redundant common elements are contained in intermediate code.

In the art described in the Unexamined Japanese Patent Application Publication No. Hei 4-009338 showing the mechanism for establishing correspondence between the intermediate code and bands to which the characters (text), graphic forms, etc., represented by the intermediate code belong, the intermediate code stored in the intermediate buffer is checked each time drawing is executed in band units. Thus, if one page is divided into N pieces, whether or not intermediate code belongs to the corresponding band needs to be determined N times, causing an efficiency problem to arise.

In the art disclosed in the Unexamined Japanese Patent Application Publication No. Sho 63-021158, the intermediate code in the intermediate buffer is previously scanned, thus if one page is divided into N pieces, which band the intermediate code belongs needs to be determined only once at the beginning; the correspondence between the intermediate code and bands can be established in a small information amount. However, a new problem also arises in the art. That is, in the system, the band map information indicating which band each intermediate code belongs is provided in an area separate from the intermediate buffer, thus an intermediate buffer overflow and a band map information storage area overflow may occur separately on memory management and need to be handled separately, leading to complicated overflow handling.

In particular, this invention relates to a drawing system, a drawing method, a medium, a printer, and an image display unit for performing drawing processing by a so-called banding method.

Hitherto, in a field of page printers, etc., a drawing system has been known which has a so-called banding function of dividing one page into bands for expanding print data comprising code data into bit map data for each band to save a memory. To divide one page into bands for expanding print data into bit map data in a drawing memory (band buffer), it is necessary to prepare intermediate code with added management information to distribute print data to bands and provide an intermediate buffer for storing the intermediate code.

The data amount of the intermediate code stored in the intermediate buffer depends greatly on which level of code data to bit map data the intermediate code is prepared at. Generally, in a drawing system which stores drawing information giving a drawing instruction and attribute information attendant on the drawing information in an intermediate buffer as intermediate code, the code amount lessens as the intermediate code is prepared at a level closer to print data (code data in PDL, etc.,). It grows as the intermediate code is prepared at a level close to bit map data into which print data is furthermore expanded. Various types of drawing information and attribute information are possible depending on the intermediate code level, etc.,; for example, the drawing information includes drawing specification of a point, a line, a rectangular area, etc., and the attribute information includes fill pattern information (information concerning the presence or absence of a pattern and the pattern type if a pattern exists) and information such as logical operation specification on a source and an expansion destination memory and clip area specification.

Therefore, to decrease the intermediate code amount and lessen the intermediate buffer capacity, it is desirable to adopt intermediate code at a level closer to print data. However, if intermediate code at a level closer to print data is adopted, complicated code data would overflow from the intermediate buffer because of an increase in attribute information, etc. One of conventionally available countermeasures against such an overflow is a method of expanding some intermediate code stored in an intermediate buffer in a band buffer as a temporary measure, compressing and saving the resultant code in another storage area, and storing remaining overflow intermediate code in the intermediate buffer, then merging the intermediate code, when expanding the intermediate code in the band buffer, with the data resulting from decompressing the compressed code data. Another countermeasure is a method of again preparing intermediate code at low resolution, thereby decreasing the code amount.

By the way, paying attention to the fact that the proportion of attribute information to the whole increases if a high level such as drawing information and attribution information is adopted as intermediate code, a method of storing attribute information in an intermediate buffer only when the attribute information value changes is possible as a measure for furthermore decreasing the intermediate code amount. However, this method introduces a problem of image quality degradation caused by an attribute information mismatch when the intermediate code is expanded for each band. Specifically, to output entries of the first band (drawing information belonging to the band) to entries of the last band in sequence from the intermediate buffer, when entry output of each band is started, the initial value of the attribute information to be originally set is not set, the attribute information corresponding to the last entry of the preceding band is set, and drawing is executed based on erroneous attribute information.

SUMMARY OF THE INVENTION

It is therefore an object of the invention to provide an image processing system for decreasing the information amount of intermediate code, thereby raising the use efficiency of an intermediate buffer and decreasing necessary intermediate buffer size, determining which band intermediate code belongs to at high speed, and enabling easy memory management.

To the end, according to the invention, there is provided an image processing system comprising number-of-divisions determination means for determining how many bands one page is to be divided into, conversion means for converting code data of at least one page into intermediate code, an intermediate buffer for storing the intermediate code, selection means for selecting the intermediate code corresponding to a specific band out of the intermediate buffer, expansion means for expanding the intermediate code to bit map data, and a band memory for storing the resultant bit map data, characterized by separation means for separating the elements of the intermediate code into proper information and attribute information, intermediate code determination means for determining whether or not elements of the preceding intermediate code differ from the corresponding elements of the subsequent intermediate code, control means for storing the corresponding elements of the subsequent intermediate code in the intermediate buffer if the intermediate code determination means determines that the elements of the preceding intermediate code differ from the corresponding elements of the subsequent intermediate code, and restoration means for restoring the subsequent attribute information using the preceding attribute information code when the intermediate code is output from the intermediate buffer to the expansion means.

The image processing system further includes area information addition means for adding area information indicating which band the code is valid on to the proper information and attribute information of the intermediate code or only to the proper information.

The number-of-divisions determination means is means for determining how many bands one page is to be divided into. For example, it may be means for dividing every image into N bands or determining the number of divisions in response to tradeoffs of the size of the image to be formed and the band memory size, etc. On the one hand, if the number of bands into which one page is divided is too much small, objects of characters, graphic forms, etc., contained in one band increases and the intermediate code amount corresponding to one band also increases, resulting in requirement for a large-capacity band memory; the meaning of providing the banding function is ignored. On the other hand, if the number of bands into which one page is divided is too much large, one object of a character, a graphic form, etc., extends across more than one band and subsequent processing becomes intricate; smooth image formation cannot be executed. Therefore, how many bands one page is to be divided into needs to be determined considering the balance between the band memory capacity and the image processing capability of the printer.

The conversion means is means for converting code data of at least one page into intermediate code. For example, it may be means for determining the type of code data input from a personal computer, etc., interpreting the syntax of the code data in response to the type, and preparing intermediate code in response to the instruction defined by interpreting the syntax. Here, the code data refers to a PDL or a printer language and the intermediate code is a data representation format having intermediate nature between the code data and bit map data (see FIG. 14). Whether the intermediate code is set to the format close to the code data or bit map data is determined considering the balance between the intermediate buffer size and the image processing capability of the printer. If the intermediate buffer size can be made large, it is desirable to set the intermediate code to the level close to the bit map data to prevent load from being imposed on image processing of the printer when intermediate code is expanded to bit map data. On the other hand, if the intermediate buffer size cannot be made large, it is desirable to set the intermediate code to the level close to the code data although load is imposed on image processing of the printer when intermediate code is expanded to bit map data.

The intermediate buffer is a memory for storing the intermediate code into which code data is converted. It can store intermediate code of at least one image page. For example, addresses of a partial area of the memory installed in the printer may be allocated to the intermediate buffer and be shared between the intermediate buffer and the image memory, etc. A memory dedicated to the intermediate buffer can also be installed. To share the memory space between the intermediate buffer and the image memory, etc., if the band memory size changes with the paper size, the remainder can be allocated to the intermediate buffer and the memory efficiency can be raised as a whole, but control becomes complicated. To install a dedicated memory to the intermediate buffer, control is easy, but the memory efficiency lowers as a whole. Thus, considering the object of the invention, namely, a decrease in the memory size, preferably the memory space is shared between the intermediate buffer and the image memory, etc.

The selection means is means capable of selecting only the intermediate code corresponding to a specific band out of the intermediate buffer based on the area information added to the intermediate code by the area information addition means described later.

The expansion means is means for expanding the selected intermediate code to bit map data. For example, it may be means for interpreting the syntax of the intermediate code and expanding the intermediate code to data indicating whether or not drawing is to be executed for each pixel on the screen in response to a drawing instruction defined by interpreting the syntax.

The band memory can store bit map data for each band. For example, addresses of a partial area of the memory installed in the printer may be allocated to the band memory and be shared between the band memory and the intermediate buffer, etc. A memory dedicated to the band memory can also be installed. However, preferably the memory space is shared between the band memory and the intermediate buffer, etc., for the reason described above for the intermediate buffer.

The intermediate code determination means is means for determining whether or not elements of the preceding intermediate code differ from the corresponding elements of the subsequent intermediate code, and transmits the determination result to the control means, which then stores the elements of the subsequent intermediate code in the intermediate buffer if it is determined that the elements of the preceding intermediate code differ from the corresponding elements of the subsequent intermediate code in response to the signal transmitted from the intermediate code determination means.

For example, the intermediate code determination means stores the elements of the attribute information of the first intermediate code in the memory as the most recent information and inputs the elements of the attribute information of the second intermediate code, then compares the attribute information elements with the most recent information. If the most recent information differs from the corresponding elements of the attribute information of the second intermediate code (for example, if the most recent information element, character size, is "12 pt" and the corresponding element of the second intermediate code, character size, is "18 pt"), the intermediate code determination means sends a signal indicating that the elements differ to the control means, which then updates the corresponding element of the most recent information to the element of the attribute information of the second intermediate code (in the example, character size "18 pt") in response to the signal. The control means stores the updated most recent information element (in the example, character size "18 pt") in the intermediate buffer.

If the most recent information is the same as the elements of the attribute information of the second intermediate code (for example, if the most recent information element, character size, is "12 pt" and the corresponding element of the second intermediate code, character size, is also "12 pt"), the intermediate code determination means sends a signal indicating that the elements are the same to the control means, does not update the most recent information, and inputs the attribute information of the third intermediate code. In this case, the control means performs no operation. The sequence may be repeated for determining the elements of the attribute information of the intermediate code stored in the intermediate buffer.

The restoration means is means for restoring the subsequent attribute information using the preceding attribute information code when the intermediate code is output from the intermediate buffer to the expansion means. For example, when the intermediate code is output from the intermediate buffer to the expansion means, all elements of the attribute information of the first preceding intermediate code, such as font and character size, are stored in the memory as the most recent information. The elements of the most recent information corresponding to the elements not contained in the attribute information of the second intermediate code (for example, character size) are used as the elements of the attribute information of the second intermediate code and restoration of the attribute information of the second intermediate code is complete. For the elements of the attribute information contained in the second intermediate code (for example, font), the most recent information stored in the memory is updated and is used to restore the attribute information of the third intermediate code. The sequence may be repeated for restoring the attribute information of the intermediate code.

The separation means is means for separating the elements of the intermediate code into proper information and attribute information. Here, separation of which elements of the intermediate code into the proper information and the attribute information is not absolute. The control means determines intermediate code element change; the intermediate code elements whose change is to be determined are predetermined for convenience. It is recognized experientially that intermediate code elements less changed and those much changed exist. The intermediate code elements less changed are stored in the intermediate buffer as they are, and only the intermediate code elements much changed are processed by the control means, whereby processing of the control means can be lessened for decreasing load. Therefore, ideally the separation is executed matching the type of image to be formed.

As a larger number of elements of the same attribute are collected, the intermediate buffer size can be decreased. For example, when the image to be formed contains a list of not much changed characters as in FIG. 1A, it is desirable to separate the character code and position of the intermediate code elements into the proper information and the font, size, and qualification into the attribute information. On the other hand, when the image to be formed contains a list of much changed characters as in FIG. 1B, the character code, position, font, and size of the intermediate code elements are separated into the proper information and the qualification is separated into the attribute information.

Separation of which elements of the intermediate code into the proper information and the attribute information may be preset or may be determined for each page by the system. If it is preset, the system configuration is simplified, but not all common attributes can be collected and the same attribute information is much contained, resulting in an increase in the intermediate buffer size. If it is determined for each page by the system, the system configuration becomes complicated, but common attributes can be collected as much as possible and the same attribute information can be excluded, so that the intermediate buffer size can be lessened.

The area information addition means is means for adding area information indicating which band the object represented by the intermediate code belongs to, to the proper information and attribute information of the intermediate code or only to the proper information. For example, if the object belongs to one band, the area information addition means may be means for preparing such information to specify the band and adding the information to the memory area storing the proper information and attribute information of the intermediate code representing the object or only the proper information.

In particular, it is therefore an object of the invention to provide a drawing system, a drawing method, a medium, a printer, and an image display unit that can thin out attribute information for decreasing the intermediate code amount without involving an attribute information mismatch to divide one page into bands and expand in a drawing memory as bit map data.

To the end, according to the invention, there is provided a drawing system for converting code data of a page image consisting of drawing information at least giving a drawing instruction and attribute information specifying a new attribute after change only if an attribute of the drawing information changes into bit map data and expanding in a drawing memory, the drawing system comprising:

intermediate code preparation means for inserting management information to divide a page image into bands for expansion into input code data and preparing intermediate code;

an intermediate buffer that can be accessed at random for storing the intermediate code prepared by the intermediate code preparation means;

storage means for storing initial values of attribute information specified at the beginning of a page in the code data;

expansion means for reading the intermediate code from the intermediate buffer for each band and expanding partial images of the first band to the nth band (n is an integer of 2 or more) in sequence in the drawing memory based on the drawing information and the attribute information; and attribute information specification means for specifying the initial values of attribute information stored in the storage means in the expansion means when the expansion means starts expansion at the top of each band.

The drawing system of the invention may further include:

control means, if a code amount of the intermediate code exceeds a capacity of the intermediate buffer, for controlling so that the data of the portion written into the intermediate buffer is previously expanded in the drawing memory by the expansion means, then remaining overflow data is written into the intermediate buffer and is expanded in the drawing memory by the expansion means and is merged with the portion previously expanded in the drawing memory;

second storage means for storing attribute information specified just before the intermediate buffer overflows when the intermediate buffer overflows; and second attribute information specification means for specifying the attribute information stored in the second storage means in the expansion means when the expansion means starts expansion at the top of the overflow data written into the intermediate buffer.

BRIEF DESCRIPTION OF THE DRAWINGS

In the accompanying drawings:

FIG. 9 is an illustration to show how intermediate code is restored;

FIG. 13 shows data flows in conventional printers; and

DETAILED DESCRIPTION OF THE PREFERRED EMBODIMENTS

Referring now to the accompanying drawings, there are shown preferred embodiments of the invention.

First Embodiment

Figure 1A:
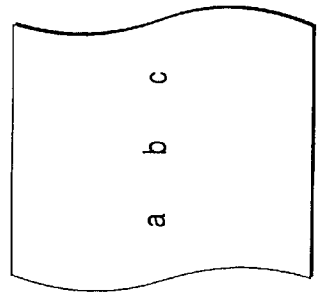
FIG. 1 is an illustration to show characters of objects and represent them in intermediate code.
Figure 1B:
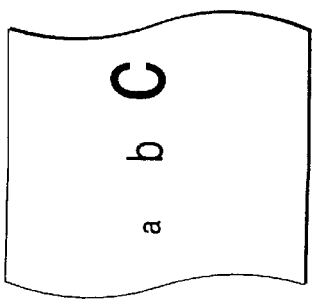
Figure 2:
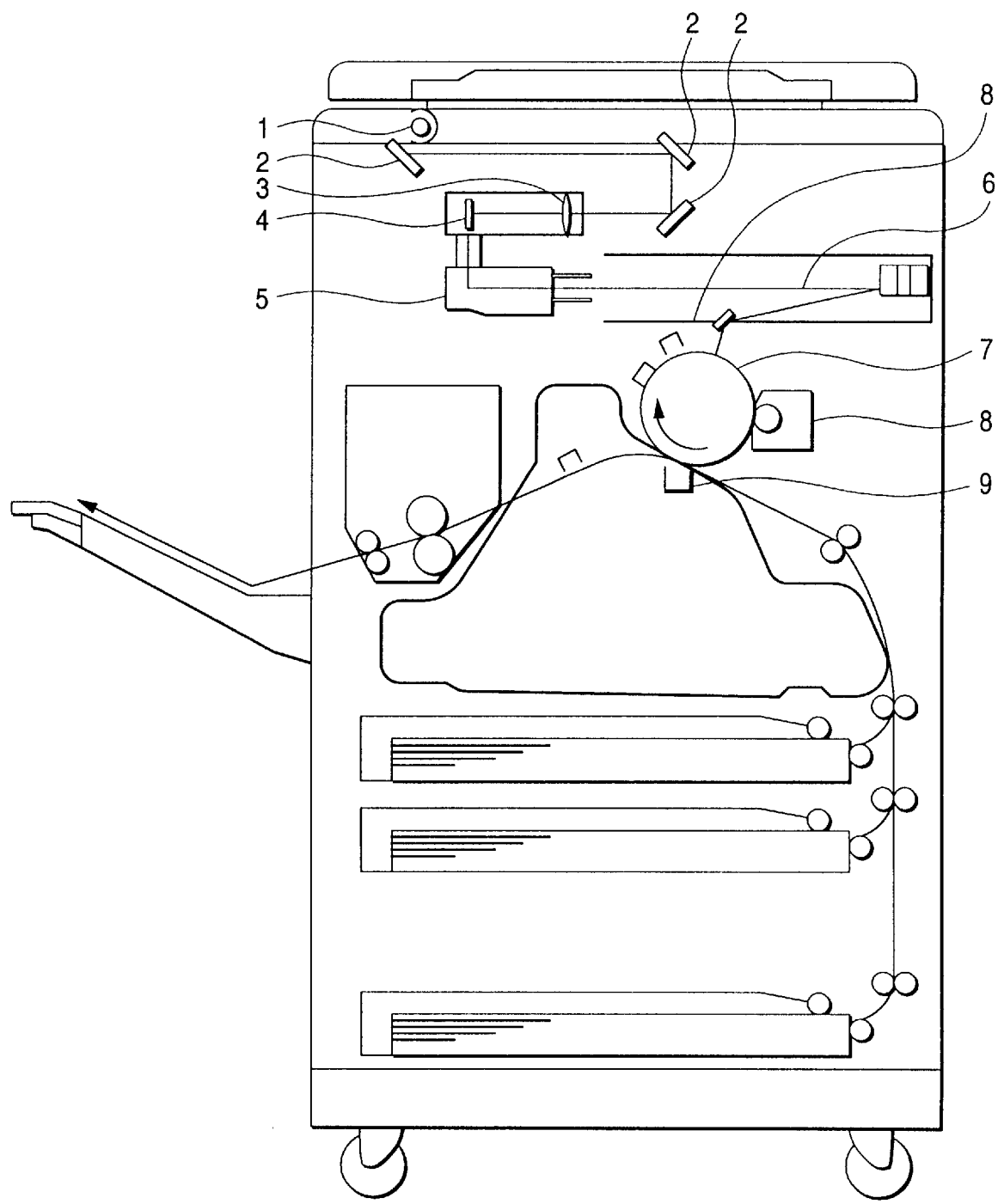
FIG. 2 is a sectional view of a complex machine to which the invention is applicable.

First, an example of a complex machine to which the invention is applicable will be discussed with reference to FIG. 2 before description of the configuration of the invention. The complex machine can be divided into the four parts: An image input terminal (IIT) for reading an image and converting the read image into an electric signal, an image processing system (IPS) for correcting, converting, and editing images, an electric subsystem (ESS) for reading input data from a personal computer, etc., and converting the data into print data in accordance with print specification of a print job, and an image output terminal (IOT) for converting an electric signal into a light signal and executing image formation using xerography from an electrostatic latent image.

The IIT adopts a reduction optical system using a halogen lamp 1, a mirror 2, and a lens 3 and comprises a sensor 4. A signal read through the sensor is amplified by an analog amplifier and is converted into a digital signal by an A/D converter.

The IPS performs processing for digital signals coming from the IIT and generates electric signals fitted to the IOT characteristics.

The ESS, which is related to the invention, interprets a page description language and a printer control language input through various interfaces from a network, a serial cable, a parallel cable, a communication line, etc., expands font, etc., stored in a read-only memory (ROM) in the ESS to bit map data, and outputs the bit map data as a video signal through a video interface to the IOT.

The IOT inputs the electric signal output from the video interface of the ESS to a driver for performing inversion control of a semiconductor laser and converts the electric signal into a light signal. A laser beam scanner 6 consists of an infrared semiconductor laser, a lens, and a polygon mirror and scans a photosensitive drum 7 as spot light. The photosensitive drum 7 is charged by a charger 8 and an electrostatic latent image is formed by a light signal. The latent image is made a toner image by a rotary developing device 8 and the toner image is transferred onto recording paper attracted on a transfer drum 9. The configuration around the photosensitive body is called a printer engine 81.

Figure 3:
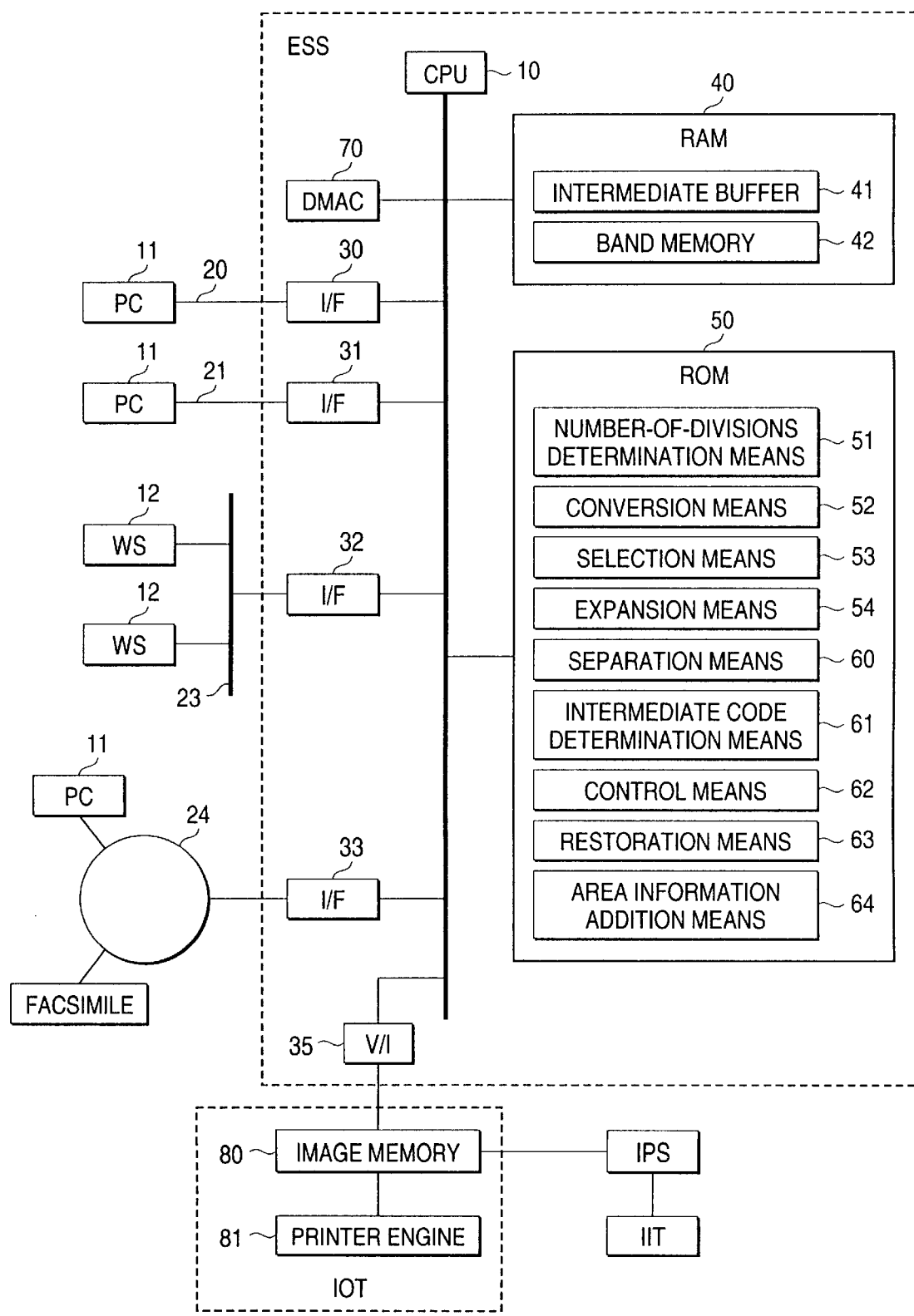
FIG. 3 is a block diagram to represent the configuration of a complex machine to which the invention is applicable.

Next, the configuration of a first embodiment of the invention will be discussed with reference to a block diagram in FIG. 3. First, code data of a PDL or a printer language is input to a serial interface 30, a parallel interface 31, a network interface 32, or a communication line interface 33 of an image processing system over a serial cable 20 or a parallel cable 21 from a personal computer 11, over a network 23 from a workstation 12, or over a telephone line 24 form a personal computer, etc.

Dividing of the input code data into bands is determined for each page of image by number-of-divisions determination means 51 and the input code data is interpreted and converted into intermediate code by conversion means 52. At this time, the intermediate code is divided into proper information and attribute information by separation means 60. Area information indicating which of the bands the code is valid on is added to the proper information and the attribute information by area information addition means 64. Addition of the area information eliminates the need for later determination as to which band the intermediate code belongs to, so that image processing can be speeded up. Since the area information is added to the intermediate code, a separate area information area need not be provided in a RAM 40 and memory management can be executed simply in overflow handling, etc.

Of the intermediate code separated into the proper information and the attribute information, all the proper information is stored in an intermediate buffer 41 existing in one area of the RAM 40 by control means 62, but the attribute information is stored in the intermediate buffer 41 only if it is determined by intermediate code determination means 61 that the attribute is changed. Since attribute information with no attribute change is not stored in the intermediate buffer 41, redundant attribute information is excluded and the intermediate buffer size can be reduced. Particularly in general text documents, the effect is noticeable because the font, character size, character qualification information, and the like little change.

For the intermediate code of at least one image page stored in the intermediate buffer 41, the intermediate code belonging to a specific band is selected based on the area information by selection means 53, the attribute information is restored by restoration means 58, and the intermediate code is stored in an empty area of the intermediate buffer. The stored intermediate code is expanded to bit map data by expansion means 54 and the bit map data is stored in a band memory 42 existing in one area of the RAM 40. The stored bit map data in band units is converted into an electric signal directly through a video interface 35 by direct memory access control (DMAC) 70 and the electric signal is output to an image memory 80 of an IOT 20. The image memory 80 is provided with a 1-page frame memory. After the bit map data of all bands of one page is transferred to the frame memory, an image is formed by a printer engine 81 based on the electric signal output to the image memory 80.

The number-of-divisions determination means 51, the conversion means 52, the selection means, the expansion means 54, the area information addition means 64, the separation means 60, the intermediate code determination means 61, the control means 62, and the restoration means 63 are stored in a ROM 50 as control programs. Various operations are performed by a CPU 10.

An operation sequence of the image processing system from code data input to bit map data output according to the preferred embodiment of the invention will be discussed with reference to flowcharts of FIGS. 4 and 5.

Figure 4:
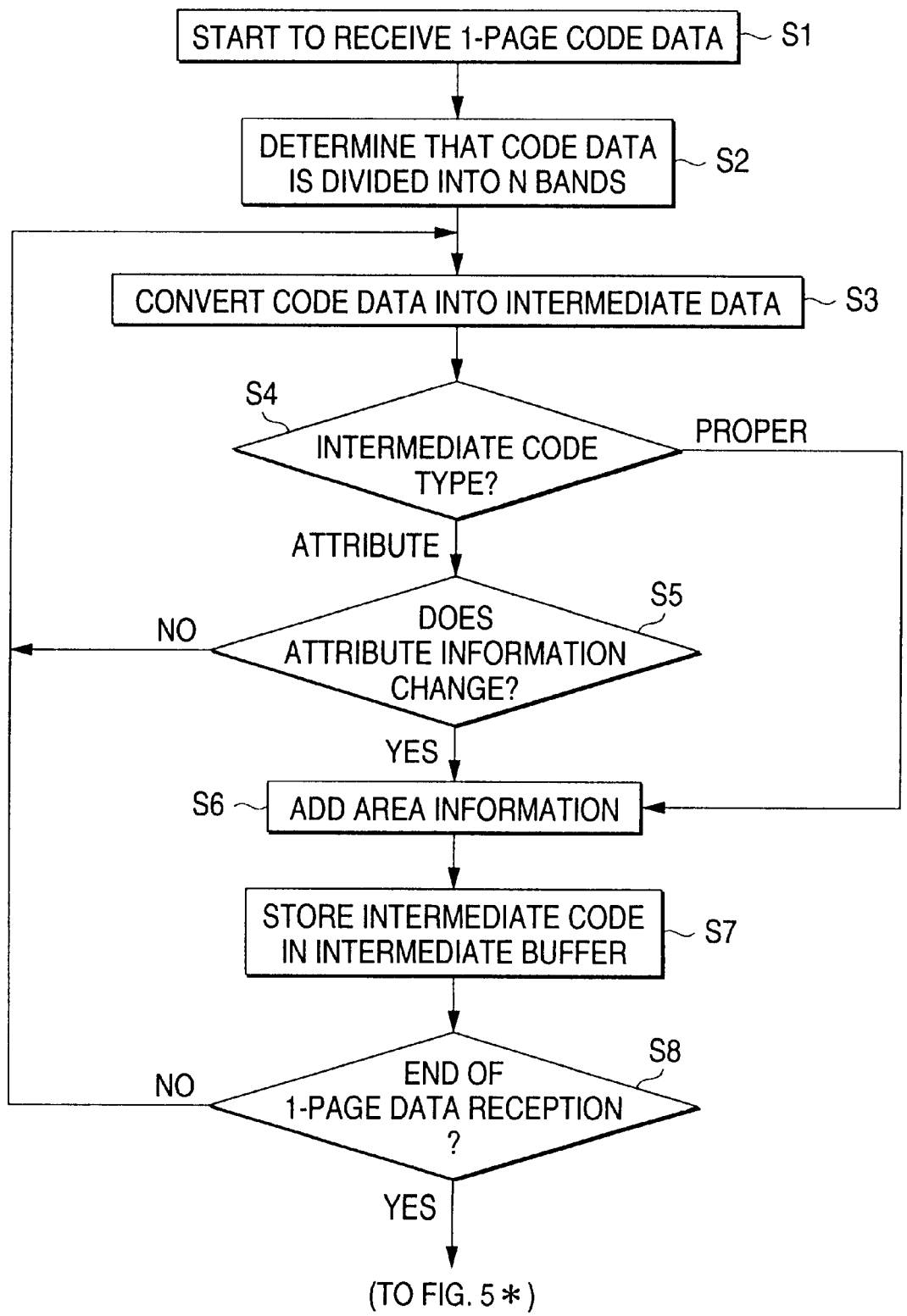
FIG. 4 is a flowchart of a processing sequence of starting to receive 1-page code data to storage of 1-page intermediate code in an intermediate buffer 41.

FIG. 4 is a flowchart of a processing sequence of reception of input code data to storage of intermediate code of one image page in the intermediate buffer. First, at step S1, the image processing system starts to receive code data of one image page through the network interface, the serial interface, the parallel interface, etc. At step S2, how many bands one image page is to be divided into is determined by the number-of-divisions determination means 51. At step S3, the code data is converted into intermediate code by the conversion means 52. At step S4, the intermediate code is separated into proper information and attribute information by the separation means 60. If attribute information is applied, control goes to step S5 at which whether or not the attribute changes from the immediately preceding attribute is determined by the intermediate code determination means 61. If the attribute information does not change, control goes to step S3 and the next intermediate code is processed, thus the attribute information is not stored in the intermediate buffer. If the attribute information changes at step S5 or proper information is applied at step S4, area information is added by the area information addition means 64 at step S6. When the area information is added at step S6, the intermediate code is stored in the intermediate buffer at step 7. Then, whether or not reception of the code data of one image page terminates is determined at step S8. If the code data reception does not terminate, control goes to step S3 and the next code data piece is received. When the code data reception of one image page terminates at step S8, it is complete.

Figure 5:
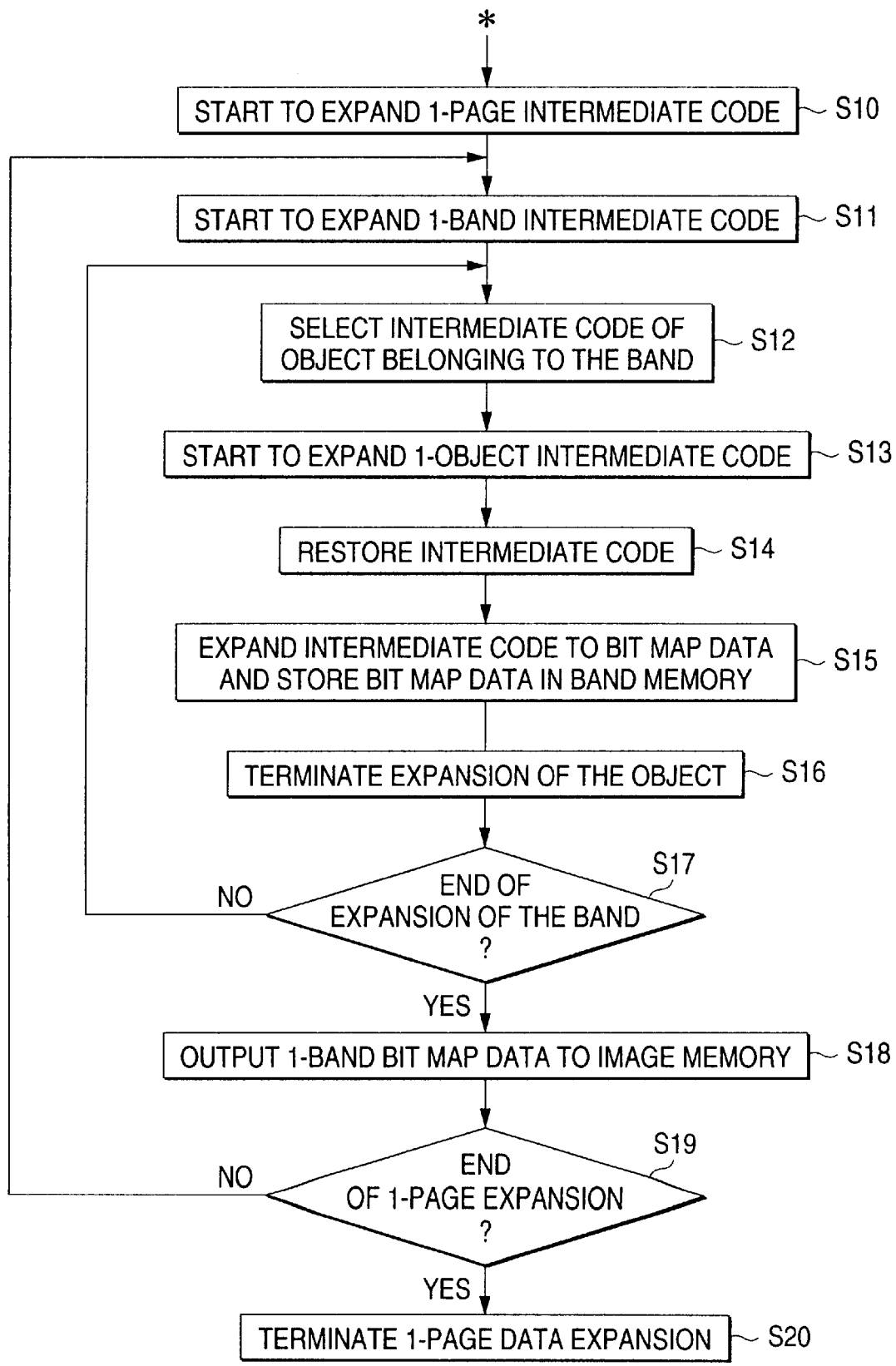
FIG. 5 is a flowchart of a processing sequence of starting to expand 1-page intermediate code to termination of expansion of the 1-page intermediate code.

FIG. 5 is a flowchart of a processing sequence of read of intermediate code from the intermediate buffer to storage of 1-page bit map data in the image memory. First, at step S10, expansion of at least 1-page intermediate code stored in the intermediate buffer is started. At step S11, expansion of intermediate code of one of bands into which one image page is divided at step S2 in FIG. 4 is started. At step S12, the intermediate code of the object belonging to the band is selected by the selection means 53. At step S13, expansion of the intermediate code corresponding to one object is started. At step S14, the attribute information not stored in the intermediate buffer (see S5 in FIG. 4) is restored and intermediate code is restored by the restoration means. At step S15, the restored intermediate code is expanded to bit map data by the expansion means 54 and the bit map data is stored in the band memory 42. At step S16, the expansion of the intermediate code of the object to the bit map data is terminated. At step S17, whether or not the expansion of the band is terminated is determined. If the expansion of the band is not terminated, control goes to step S12 and steps S12 to S17 are repeated. If the expansion of the band is terminated, the 1-band bit map data stored in the band memory 42 is output to the image memory 80 of the IOT part at step S18. Control goes to step S19 at which whether or not expansion of the 1-page image to the bit map data is terminated is determined. If the expansion is not terminated, control goes to step S11 and expansion of new 1-band intermediate code is started. If the expansion of the 1-page image to the bit map data is terminated, it is complete at step S20.

The image processing system according to the embodiment separates intermediate code into proper information and attribute information and does not store common attributes to the attribute information for decreasing the intermediate buffer size. For steps S5 and S7 in FIG. 4, a simple specific example will be discussed with reference to FIG. 6. For simplicity, the banding function (S2 in FIG. 2) and the area information addition (S6 in FIG. 4) are not considered in the specific example. The specific example assumes that the object is a character, but if the object is a graphic form, the same is also applied.

Here, an example of forming characters "abcdef" on recording paper as in FIG. 6A will be discussed. Of the intermediate code elements of the objects, character codes and character positions are proper information and the font, character size, and presence or absence of character qualification are attribute information. The attribute information of the characters "abcef" of the objects indicates the font Times-Roman, size 12 pt, and no character qualification.

The attribute information of the character "d" indicates the font Elite, size 18 pt, and no character qualification. FIG. 6B shows a description example of such image formation instruction in code data of PDL, etc.

The code data is converted into intermediate code by the conversion means 52 (see S3 in FIG. 4). A virtual table consisting of intermediate code elements on the vertical row and the characters on the horizontal row as shown in FIG. 6C is considered. First, focusing attention on character "a," the character has character code and character position as the proper information to the intermediate code and font, character size, and presence or absence of character qualification as the attribute information. The proper information is stored in the intermediate buffer 41 intact by the control means 62. The attribute information is also stored in the intermediate buffer 41 by the control means 62 because the intermediate code determination means 61 does not contain any change comparison target (see FIG. 6D).

Figures 6A, 6B, 6C, 6D:
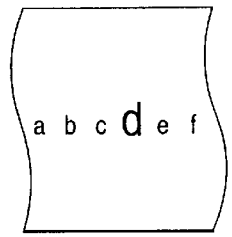
FIG. 6 is an illustration to show how 1-page code data is stored in the intermediate buffer as intermediate code.

Next, focusing attention on character "b" in FIG. 6C, the intermediate code determination means 61 determines that the font, character size, and character qualification of the attribute information are common to those of "a" adjacent on the left to the character "b" and remain unchanged. Then, the control means 62 stores the character code and character position of the proper information to "b" in the intermediate buffer as they are, and does not store the font, character size, and character qualification of the attribute information of "b" in the intermediate buffer. Likewise, for "c," the intermediate code determination means 61 compares the font, character size, and character qualification with those of "a" adjacent on the left to c. The font, character size, and character qualification remain unchanged with those of "a." Therefore, the control means 62 stores only the character code and character position of the proper information to "c" in the intermediate buffer and does not store the font, character size, and character qualification of the attribute information in the intermediate buffer (see FIG. 6D).

Focusing attention on character "d" in FIG. 6C, the intermediate code determination means 61 determines that the font and character size of the attribute information differ from those of the character "a" adjacent on the left to the character "d" and that the character qualification is common to that of the character "a" adjacent on the left to the character "d." Therefore, the control means 62 stores the character code and character position of the proper information in the intermediate buffer as they are. It stores only the font and character size of the attribute information and does not store the character qualification in the intermediate buffer. Likewise, focusing attention on character "e" in FIG. 6C, the intermediate code determination means 61 determines that the font and character size of the attribute information differ from those of the character "d" adjacent on the left to the character "e" and that the character qualification is common to that of the character "a" adjacent on the left to the character "e." Therefore, the control means 62 stores the character code and character position of the proper information in the intermediate buffer as they are. It stores only the font and character size of the attribute information and does not store the character qualification in the intermediate buffer.

Focusing attention on character "f" in FIG. 6C, the intermediate code determination means 61 determines that the font and character size of the attribute information are common to those of the character "e" adjacent on the left to the character "f" and that the character qualification is common to that of the character "a" adjacent on the left to the character "f." Therefore, as with "intermediate code of e," the control means 62 stores the character code and character position of the proper information in the intermediate buffer 41 as they are, and does not store the font type, character size, and character qualification of the attribute information in the intermediate buffer.

Thus, the redundant common attribute information is deleted and the intermediate code is stored in the intermediate buffer. Since the ESS needs to expand objects to bit map data finally, the intermediate code must be restored completely. A sequence to complete restoration of intermediate code from the state in which common attribute information is deleted will be discussed with the specific example about the topics of area information addition (step S6 in FIG. 4), intermediate code selection (step S12 in FIG. 5), and intermediate code restoration (step S14 in FIG. 5).

In the embodiment, the area information indicating which band the intermediate code is valid on is added to the proper information and the attribute information of the intermediate code by area information addition means 64, whereby the correspondence between the intermediate code and specific bands needs to be determined only once and memory management is facilitated at the same time. What the area information is, how the area information is added to intermediate code (step S6 in FIG. 4), and how the intermediate code of objects belonging only to a specific band is selected (step S12 in FIG. 5) will be discussed.

Figure 7:
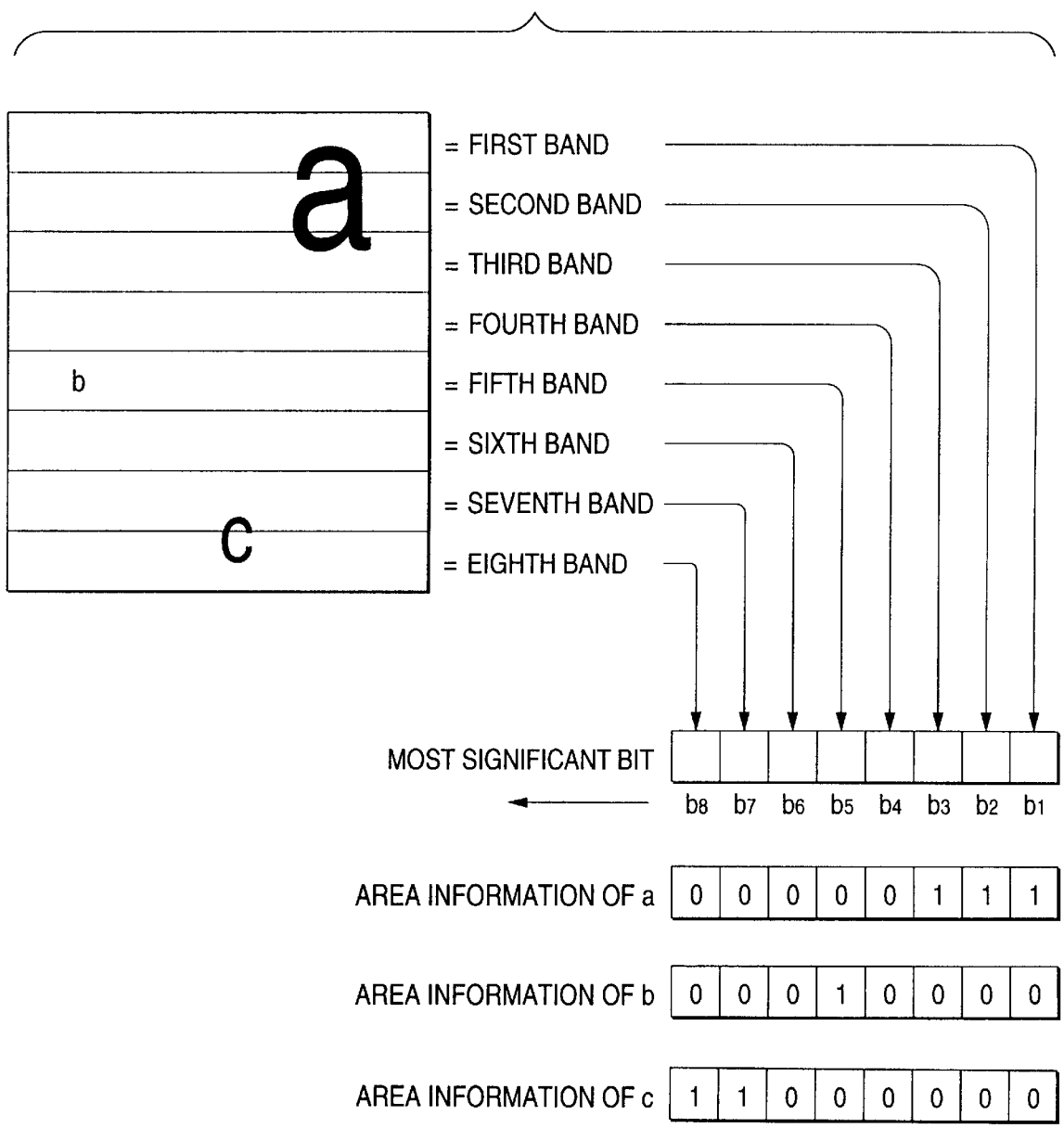
FIG. 7 is an illustration to show area information.

FIG. 7 shows an embodiment of the area information. Eight bits are provided in a one-to-one correspondence with eight bands into which one page is divided. That is, the first bit (least significant bit) corresponds to the first band, the second bit corresponds to the second band, . . . When one object exists on one band, the bit corresponding to the band is set to "1" and when no object exists on one band, the bit corresponding to the band is set to "0," thereby indicating each area in which an object exists. Since object "a" extends across the first to third bands, the area information of "a" has the first to third bits set to "1" and other bits to "0," namely, "11100000." Likewise, the area information of "b" has the fifth bit set to "1" and other bits to "0," namely, "00001000" and the area information of "c" has the seventh and eighth bits set to "1" and other bits to "0," namely, "00000011."

Figure 8B:
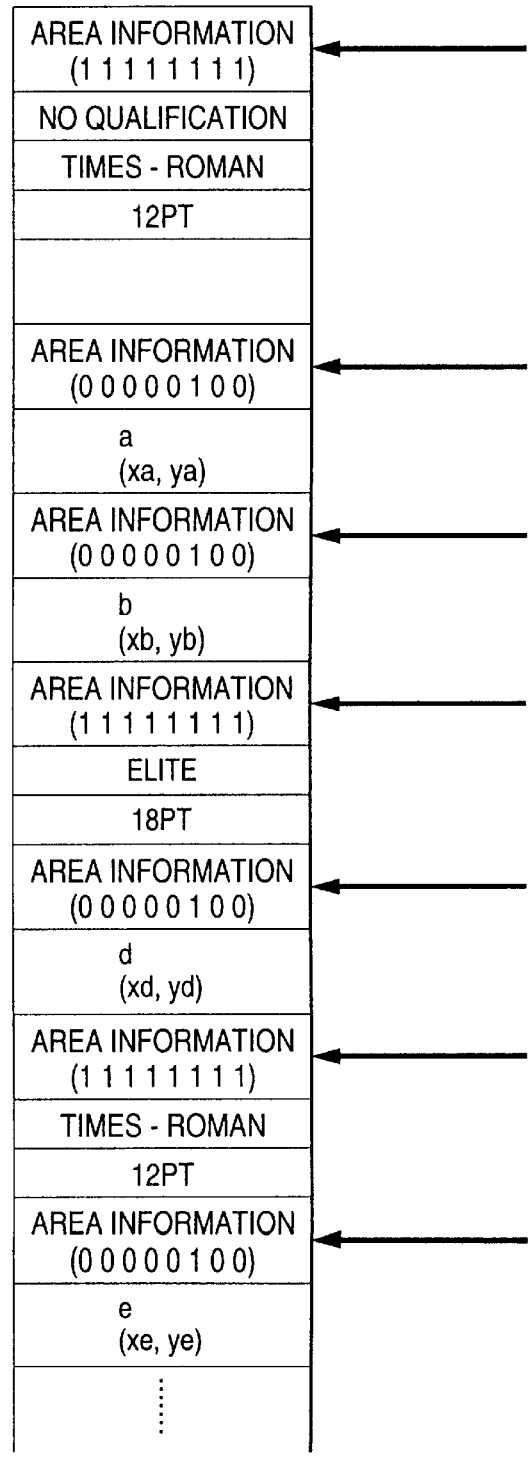
FIG. 8 is an illustration to show the intermediate buffer in the first embodiment of the invention.
Figure 8A:
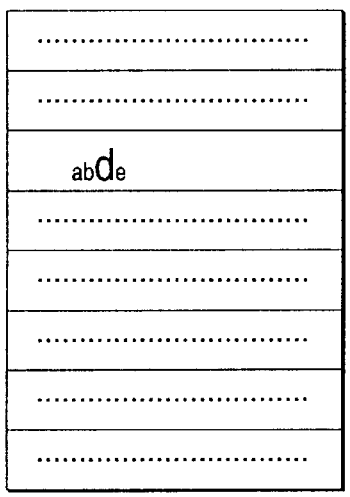

FIG. 8B represents intermediate code stored in the intermediate buffer. The intermediate code of characters "a," "b," "d," and "e" of objects in FIG. 8A is shown in detail. The intermediate code of each character has character code and print position as the proper information and presence or absence of character qualification, font, and character size as attribute information. The characters "a," "b," and "e" have the same attribute information, namely, character qualification is "none," the font is "Times-Roman," and the character size is "12 pt." The attribute information of the character "d" is "none" as character qualification, "Elite" as the font, and "18 pt" as the character size. FIG. 8A shows an image resulting from expanding the intermediate code in FIG. 8B to bit map data.

The area information is added to both the proper information and the attribute information of the intermediate code; the area information indicating the bands on which each object exists is added to the proper information and the area information valid on all bands is added to the attribute information regardless of which band the object belongs to. For example, focusing attention on the character "a" of one object in FIG. 8A, the character "a" belongs to the second band of the image divided into eight bands, thus the area information added to the proper information is "00000010" representing the second band and the area information added to the attribute information is "11111111" representing all bands.

The reason why the area information added to the attribute information represents all bands is deeply related to intermediate code restoration, thus will be discussed following the description of intermediate code restoration.

The area information is thus added, whereby the intermediate code belonging to the band to be expanded can be selected rapidly (step S12 in FIG. 5). For example, to expand the third band, the intermediate code with the third bit of the area information set to "1" is selected by the selection means, whereby the intermediate code required to expand the third band can be selected rapidly. The arrows pointing to the area information in FIG. 8B denote selection state by the selection means.

When the intermediate code corresponding to one object is stored in the intermediate buffer 41, redundancy is excluded by the control means, thus the intermediate code is not complete intermediate code with insufficient attribute information. Therefore, it needs to be restored to complete intermediate code based on the preceding attribute information. How the intermediate code is restored at step S14 in FIG. 5 will be discussed.

As prerequisites, assume that the complete intermediate code consists of the elements of presence or absence of character qualification, font, and character size as the attribute information and character code and character position as the proper information, that the intermediate code is restored by the restoration means in the order in which it is stored in the intermediate buffer by the control means, and that the characters to be printed except character "d" on the third band have the same attribute information (presence or absence of character qualification, font, and character size).

First, intermediate code elements are input to the restoration means in the order in which they are stored in the intermediate buffer by the control means (from top to bottom in FIG. 8B). The proper information to the intermediate code is stored in the intermediate buffer intact and need not be restored. Here, the attribute information of the intermediate code is to be restored. All elements of the attribute information of the first preceding intermediate code (presence or absence of character qualification, font, and character size) are stored in the memory as the most recent information. The elements of the most recent information corresponding to the elements not contained in the attribute information of the second intermediate code (for example, character size) are used as the elements of the attribute information of the second intermediate code and restoration of the attribute information of the second intermediate code is complete. For the elements of the attribute information contained in the second intermediate code (for example, font), the most recent information stored in the memory is updated and is used to restore the attribute information of the third intermediate code. The sequence is repeated for restoring the attribute information of the intermediate code.

This topic will be discussed more specifically with reference to FIG. 9, which shows how the intermediate code representing the objects belonging to the third band is restored. As the most recent information, the elements of presence or absence of character qualification, font, and character size are updated and stored by restoring the preceding intermediate code.

The intermediate code is restored in the order in which it is stored in the intermediate buffer by the control means (from top to bottom in FIG. 8B). First, the intermediate code of the character "a" is restored. The intermediate code elements of the character "a" stored in the intermediate buffer are the character code (a) and character position (xa, ya) of the proper information. They are combined with the attribute information elements of the most recent information, character qualification (none), font (Times-Roman), and character size (12 pt) to restore the intermediate code of the character "a." Since the attribute information of the character "a" is not stored in the intermediate buffer, the most recent information is not updated and the attribute information of character qualification (none), font (Times-Roman), and character size (12 pt) is held.

Next, the intermediate code of the character "b" is restored. The intermediate code elements of the character "b" stored in the intermediate buffer are the character code (b) and character position (xb, yb) of the proper information. They are combined with the attribute information elements of the most recent information, character qualification (none), font (Times-Roman), and character size (12 pt) to restore the intermediate code of the character "b." Since the attribute information of the character "b" is not stored in the intermediate buffer, the most recent information is not updated and the attribute information of character qualification (none), font (Times-Roman), and character size (12 pt) is held.

Further, the intermediate code of the character "d" is restored. The intermediate code elements of the character "d" stored in the intermediate buffer are the font (Elite) and character size (18 pt) of the attribute information and the character code (d) and character position (xd, yd) of the proper information. They are compared with the attribute information elements of the most recent information, character qualification (none), font (Times-Roman), and character size (12 pt). The element not contained in the intermediate code of the character "d," character qualification (none), is added to the elements to restore the intermediate code of the character "d." Since the attribute information of the character "d" is stored in the intermediate buffer, the attribute information, namely, the font (Elite) and character size (18 pt) are updated as the most recent information. The intermediate code of the character "e" is also restored in a similar manner.

Here, the reason why the area information added to the attribute information thus represents all bands (in the example, "11111111") will be discussed. To restore the intermediate code, as described above, the attribute information of the intermediate code is stored as the most recent information and is updated and based on the attribute information, the attribute information not stored in the intermediate buffer is restored. As a result, the entire intermediate code is restored. Therefore, the attribute information of the intermediate code needs to be selected and used for intermediate code restoration independently of which band the object (intermediate code) belongs to. For example, to restore the attribute information of the intermediate code of the object belonging to a specific band, for example, the third band in 1-page image formation, the attribute information of the intermediate code of the previously restored object (not necessarily object belonging to the third band) is stored as the most recent information and based on the attribute information, the attribute information of the intermediate code of the object belonging to the third band is restored.

The merit of adopting the technique such that the area information added to the attribute information thus represents all bands is that the intermediate code can be easily restored by a simple method. On the other hand, the area information added to the attribute information can also represent the band to which the object belongs (for example, "00000100"to the attribute information of the object belonging to the third band) to avoid updating the most recent information as much as possible. However, the font, character size, etc., is not frequently changed in normal image formation, thus the most recent information is not frequently updated; a small merit is produced. Information indicating which band the attribution information changes on must be previously scanned and stored in the memory, leading to complicated means.

Second Embodiment

A second embodiment of the invention differs from the first embodiment in that area information is not added to attribute information. A description is given centering on the difference between the second embodiment and the first embodiment.

Figure 10:
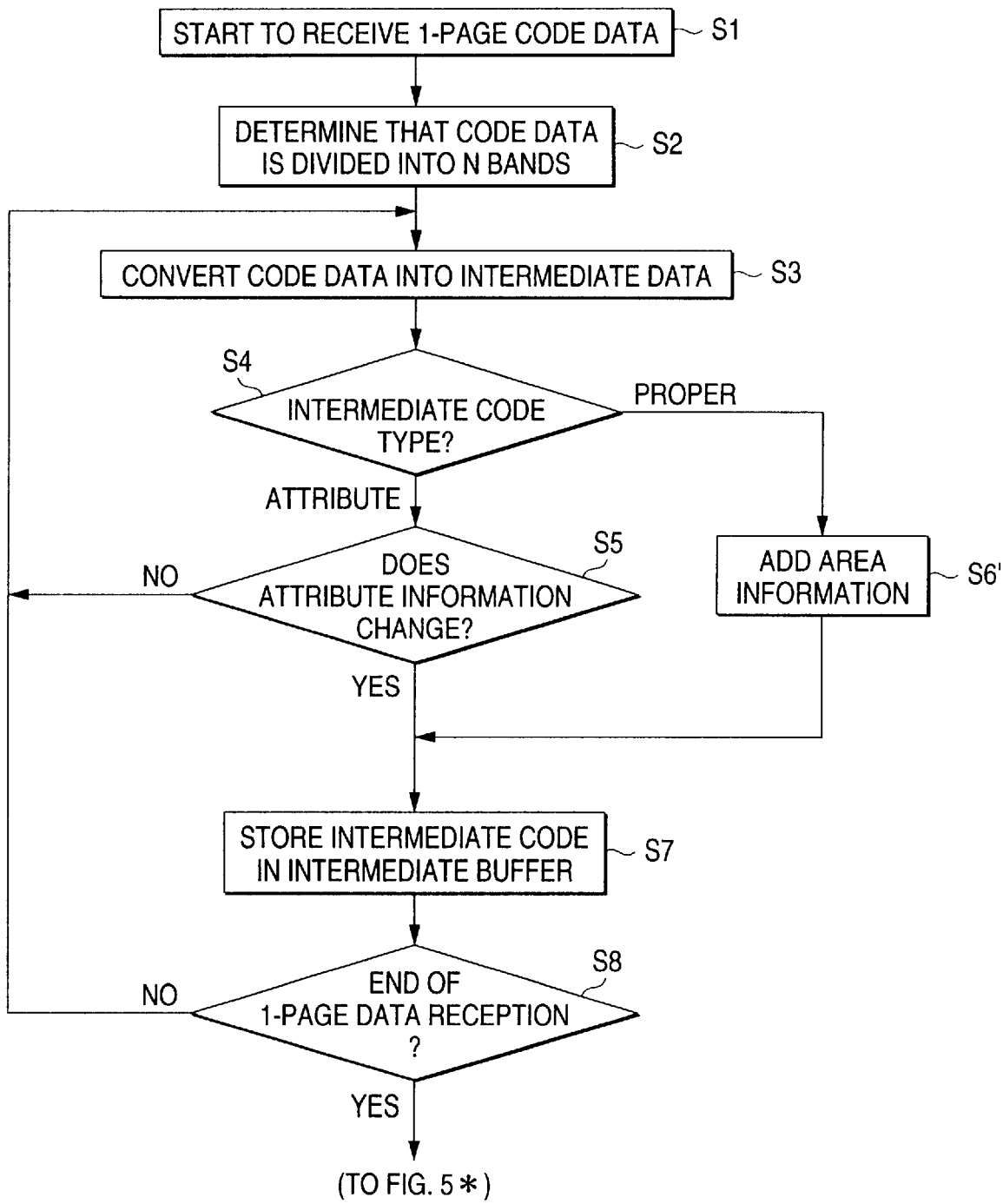
FIG. 10 is a flowchart of a processing sequence of starting to receive 1-page code data to storage of 1-page intermediate code in an intermediate buffer in a second embodiment of the invention.

FIG. 10 is a flowchart of a processing sequence of reception of input code data to storage of intermediate code of one image page in an intermediate buffer 41. It differs from FIG. 4 according to the first embodiment in that step S6 is eliminated and step S6' is added. Parts identical with or similar to those of the first embodiment are denoted by the same reference numerals. In the second embodiment, at step S4, the intermediate code type is determined. If proper information is applied, area information is added at step S6'. If the attribute information changes from the preceding attribute information at step S5, no area information is added to the attribute information and the attribute information is stored in the intermediate buffer 41 at step S7.

In the first embodiment, the selection means 53 selects the intermediate code of the object belong to the corresponding band by determining the area information at step S12 in FIG. 5. In the second embodiment, first whether the intermediate code read from the intermediate buffer 41 is proper information or attribute information is determined by separation means. If proper information is applied, the selection means 53 selects the intermediate code of the object belong to the corresponding band by determining the area information; if attribute information is applied, all are selected.

Figure 11A:
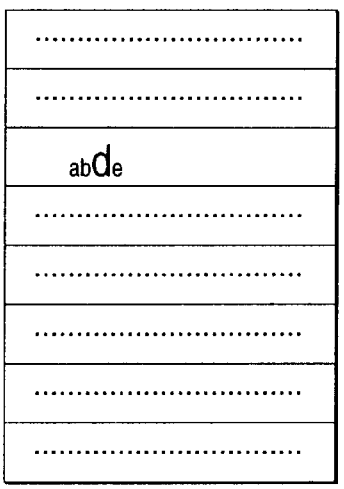
FIG. 11 is an illustration to show the intermediate buffer in the second embodiment of the invention.
Figure 11B:
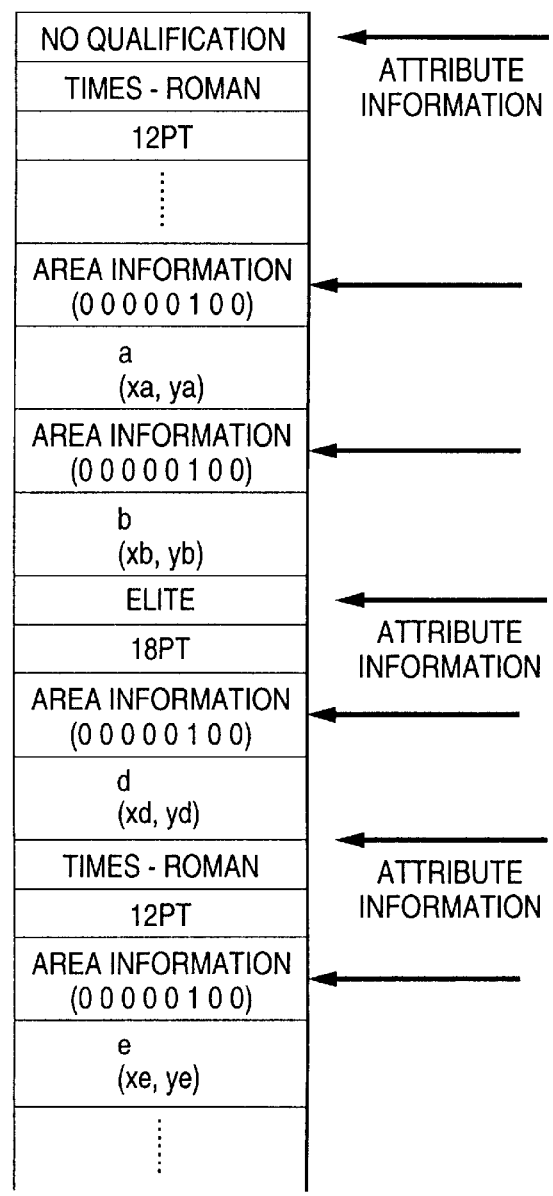
Figure 12:
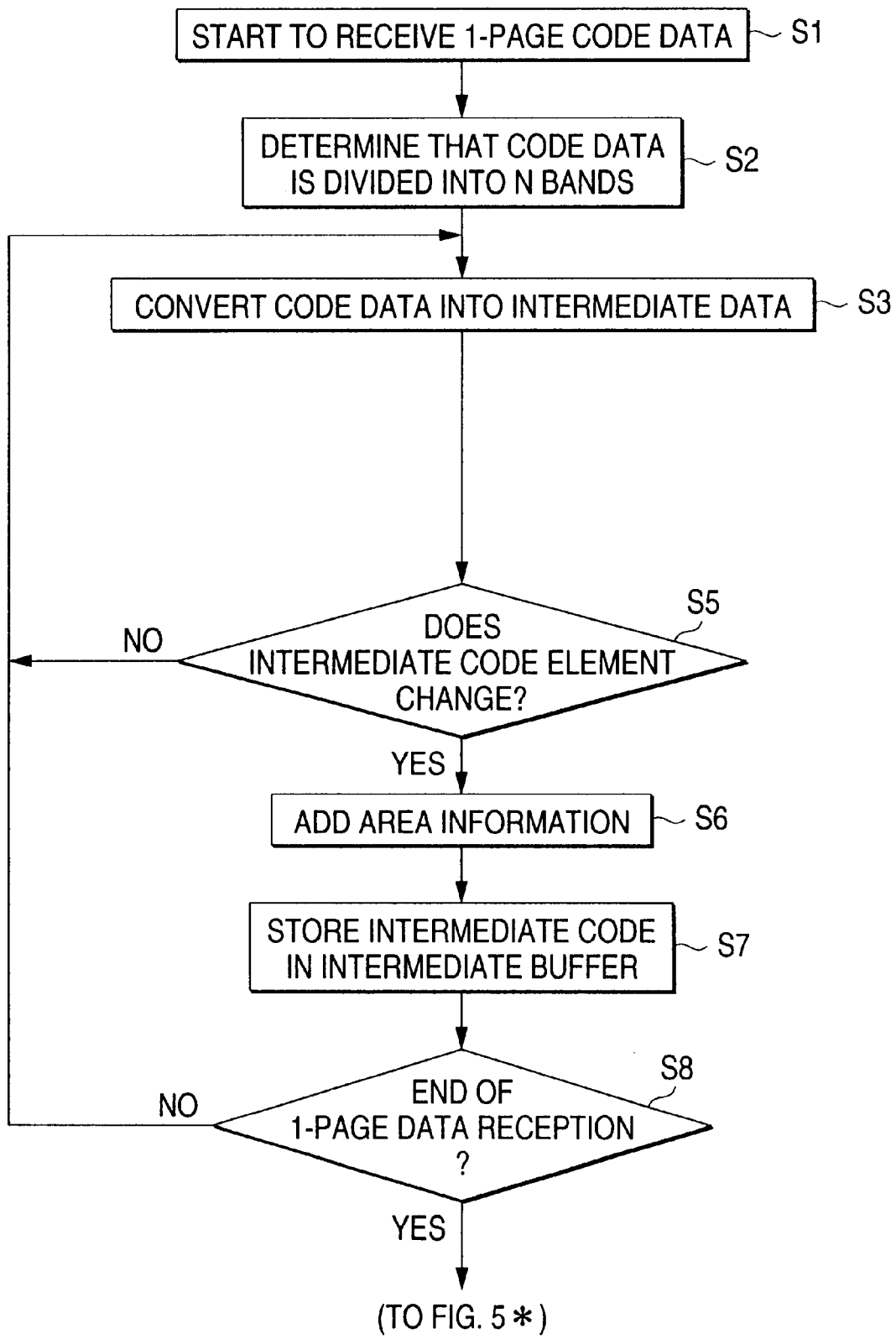
FIG. 12 is a flowchart of a processing sequence of starting to receive 1-page code data to storage of 1-page intermediate code in an intermediate buffer in a third embodiment of the invention.
Figure 14:
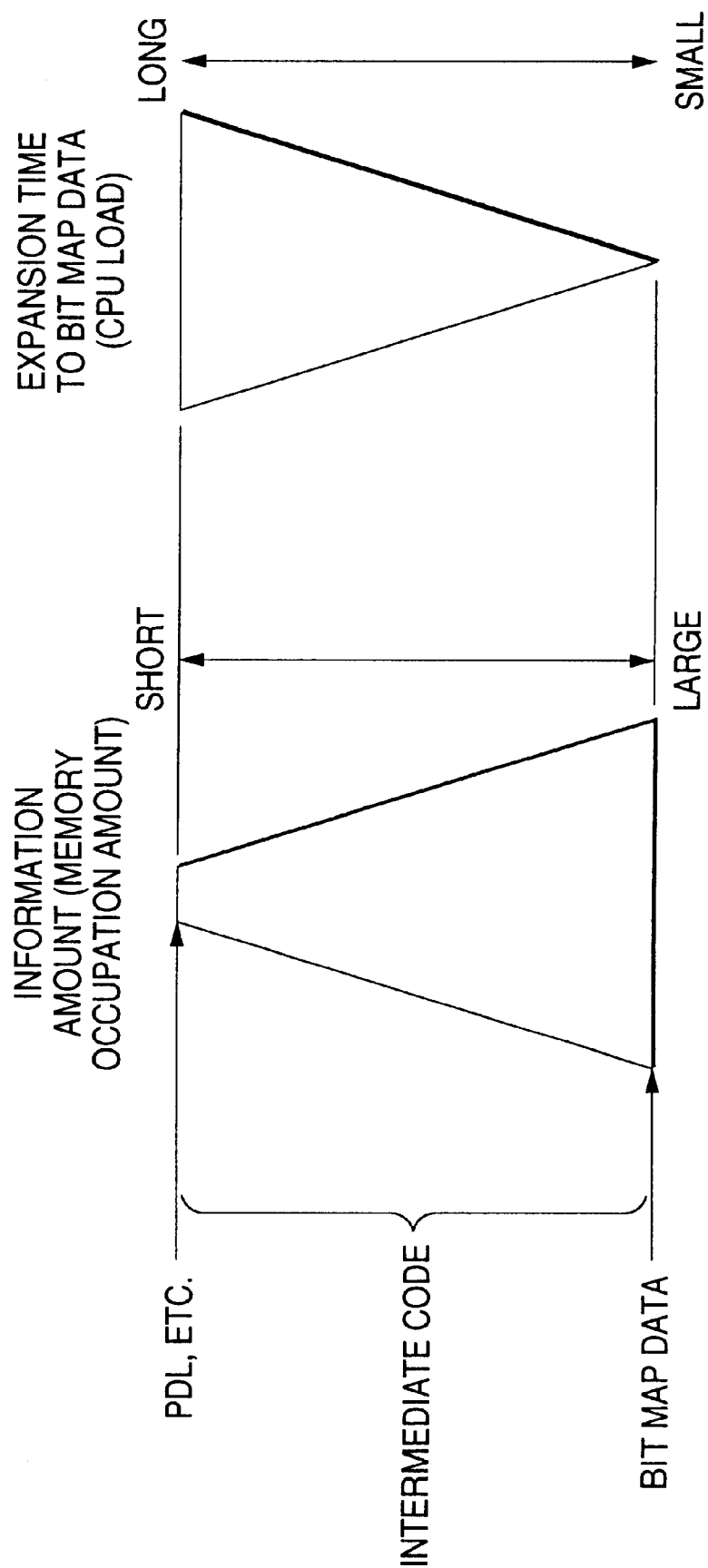
FIG. 14 shows the relationships among PDL, intermediate code, and bit map data.

FIG. 11B represents intermediate code stored in the intermediate buffer 41. The intermediate code of characters "a," "b," and "c" of objects in FIG. 11A is shown in detail. FIG. 11A shows an image resulting from expanding the intermediate code in FIG. 11B to bit map data. The intermediate code selected by the selection means according to the above-described method results in similar intermediate code to that in FIG. 8 and the attribute information is restored as in the first embodiment.

As compared with the first embodiment, the second embodiment can furthermore decrease the size of the intermediate buffer 41 because no area information is added to the attribute information. However, to select the intermediate code corresponding to the object belonging to a specific band, first whether the intermediate code is proper information or attribute information is determined. If proper information is applied, further selection needs to be executed based on the area information. Thus, the second embodiment takes time longer than the first embodiment wherein only the area information is used for selection regardless of the proper information or the attribute information.

According to the invention, the intermediate code is separated into the proper information and attribute information and when the attribute information is stored in the intermediate buffer 41, it is stored only if the attribute information changes, whereby the intermediate buffer size can be decreased.

Since the area information is added to the intermediate code, management of the intermediate code and the area information can be unified and a memory overflow, etc., can be handled easily, so that which band the intermediate code belongs to can be determined at high speed.

Further, the intermediate code is not separated into proper information and attribute information for speeding up processing and the intermediate buffer size can be decreased.

Referring now to the accompanying drawings, there are shown most preferable embodiments of the invention.

Third Embodiment (1) Configuration

Figure 15:
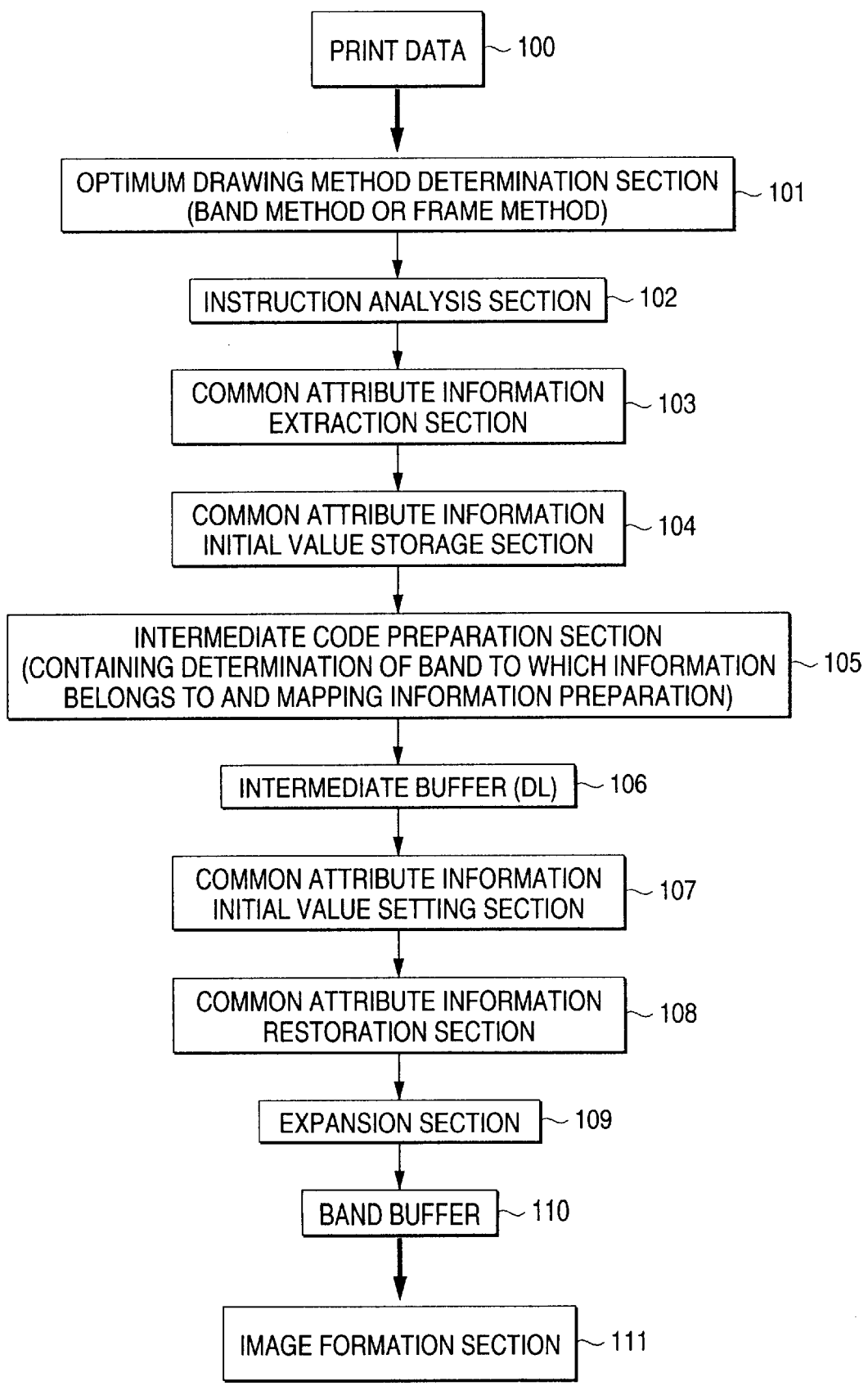
FIG. 15 is a block diagram to show the configuration of a third embodiment of the invention.

FIG. 15 is a functional block diagram to show the configuration of a third embodiment of the invention. The embodiment shown in the figure is a printer for drawing and outputting an image corresponding to supplied print image in page units, for example, and is controlled by a microcomputer consisting of a CPU (central processing unit), a ROM (read-only memory), a RAM (random access memory), etc., (not shown), thereby configuring the following providing means:

In FIG. 15, print data 100 is code data input through a network interface, a serial interface, a parallel interface, etc. The code data is made up of a page description language and emulation data, etc.

An optimum drawing method determination section 101 determines which of a frame method of drawing in page units and a band method of drawing in band units into which a page is divided is to be used for drawing from the data amount of one page of the input print data 100.

An instruction analysis section 102 interprets the input print data 100. The print data 100 consists roughly of drawing information and attribute information. The drawing information is, for example, drawing specification information of a point, a line, a rectangular area, etc. On the other hand, the attribute information consists of proper attribute information to each drawing element, such as fill pattern information, and common attribute information to the whole print data, such as line thickness and font.

Figure 16:
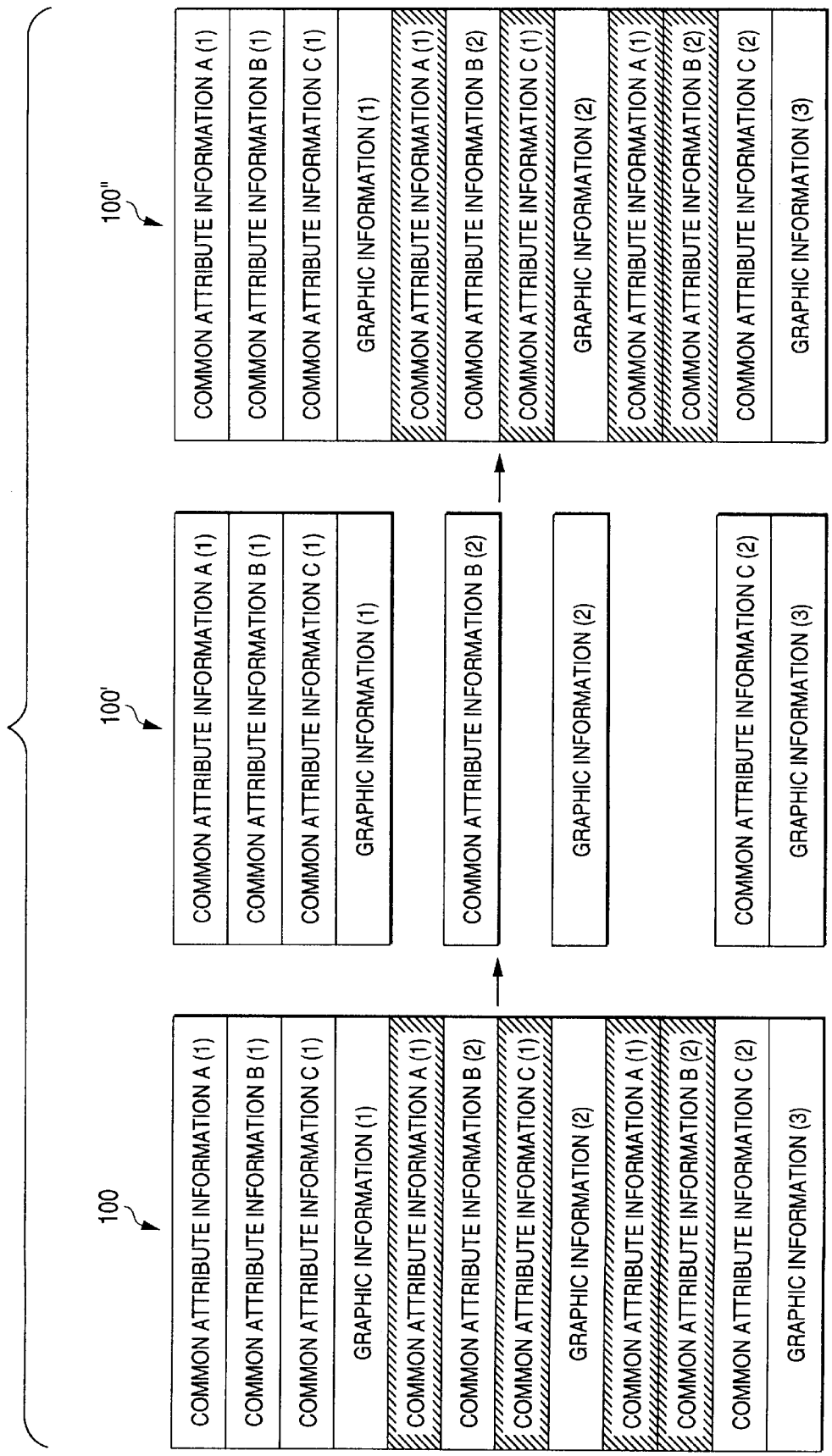
FIG. 16 is a schematic diagram to explain thinning out and restoring intermediate code in the third embodiment of the invention.

If interpreted code data is common attribute information, a common attribute information extraction section 103 determines whether or not the common attribute information changes from the preceding value, and stores the common attribute information in an intermediate buffer 106 only if the common attribute information changes. For example, as shown in FIG. 16, if print data 100 containing three pieces of common attribute information A (i), B (i), and C (i) (where i is a sequential number and when i is incremented, it indicates that the value changes) is supplied, the common attribute information pieces shaded in the figure do not change from the preceding values and thus are thinned out by the common attribute information extraction section 103 and the print data 100 is stored in the intermediate buffer 106 (reference numeral 100'). If the common attribute information is thus thinned out, the same value as the preceding one can be inserted for restoring the thinned-out common attribute information (reference numeral 100").

A common attribute information initial value storage section 104 is means for storing the initial values of common attribute information in a predetermined storage area set in RAM (not shown). The initial values of common attribute information refer to the common attribute information values specified first on each page of the input print data 100 as a rule. If the intermediate buffer 106 described later overflows, the common attribute information initial value storage section 104 stores the common attribute information values written into the intermediate buffer 106 just before the intermediate buffer 106 overflows in addition to the initial values of common attribute information.

An intermediate code preparation section 105 adds mapping information indicating the band to which each drawing information piece belongs to the drawing information interpreted by the instruction analysis section 102 and prepares an intermediate code entry. The intermediate buffer 106 is a RAM for temporarily storing intermediate code output from the intermediate code preparation section 105.

A common attribute information initial value setting section 107 reads common attribute information stored in the common attribute information initial value storage section 104 and sets the information as the initial values of common attribute information at the expansion start time of each band. The common attribute information specified at the beginning of a page is set as the initial values as a rule; if the intermediate buffer 106 overflows, the common attribute information values written into the intermediate buffer 106 just before the intermediate buffer 106 overflows are set.

If the intermediate code read from the intermediate buffer 106 is common attribute information, a common attribute information restoration section 108 updates common attribute information setting according to the common attribute information value.

An expansion section 109 interprets the intermediate code read from the intermediate buffer 106 and expands the print data into bit map data in a band buffer 110. The band buffer 110 is a RAM for storing the bit map data into which the print data is expanded by the expansion section 109 based on the intermediate code in band units. Therefore, the band buffer 110 has a capacity required for storing 1-band bit map data. The bit map data of each band is once compressed by compression means (not shown) as required and the compressed data is temporarily saved in a compressed data save memory (not shown).

Figure 17:
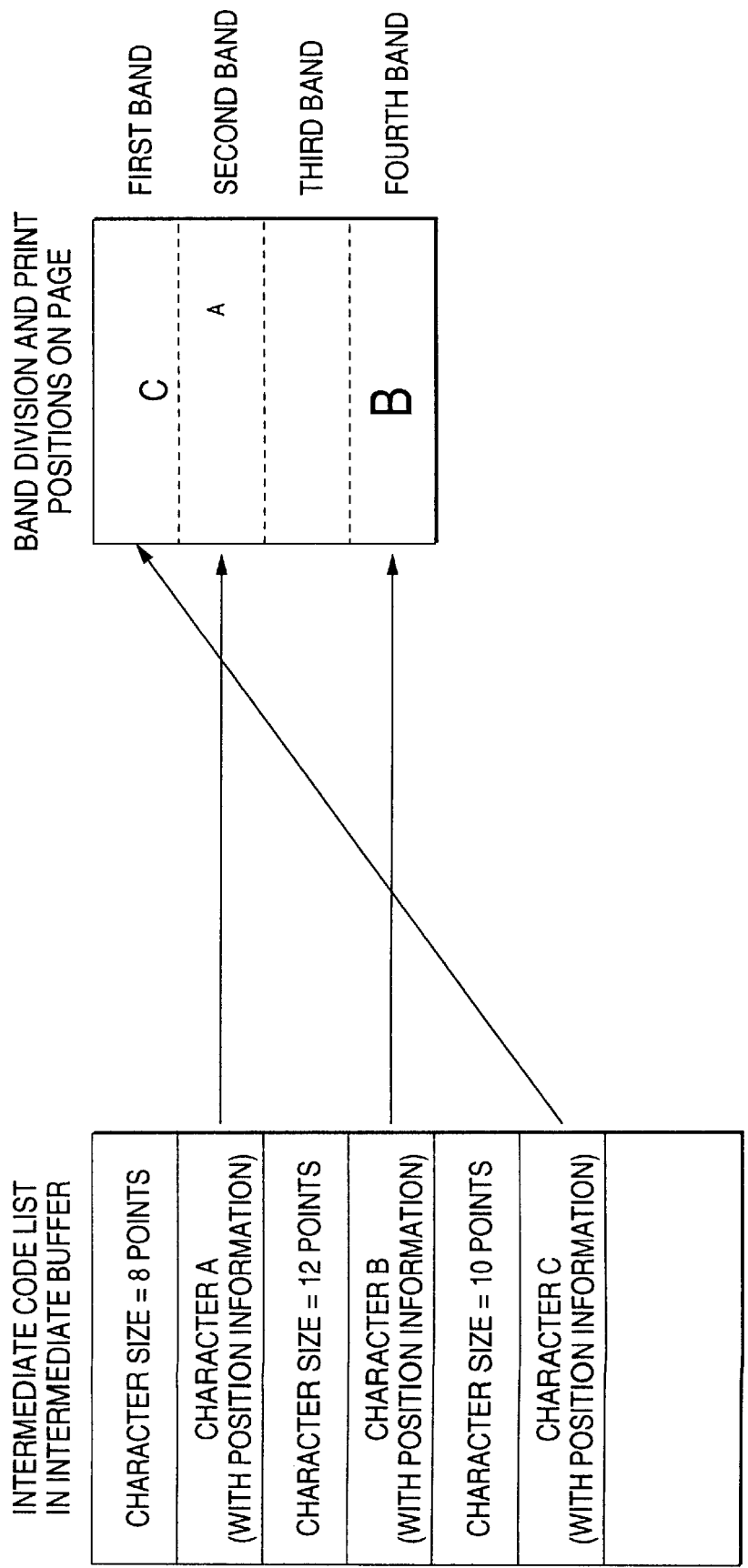
FIG. 17 is a schematic diagram to show the correspondence between an output image and intermediate code in a banding method in the third embodiment of the invention.

Further, an image formation section 111 prints out the bit map data output in sequence from the band buffer 110 for each band on print media such as paper. FIG. 17 shows the correspondence between the contents of intermediate code and the contents of a page image finally printed out by the banding method based on the intermediate code. In the figure, the drawing position belonging to the second band is specified for the entry of character A with 8-point size specified, the drawing position belonging to the fourth band is specified for the entry of character B with 12-point size specified, and the drawing position belonging to the first band is specified for the entry of character C with 10-point size specified.

(2) Outline of Operation

Next, an outline of the operation of the embodiment having the configuration will be discussed. The steps of converting 1-page print data into intermediate code and storing the intermediate code in the intermediate buffer 106, then reading the intermediate code for each band and drawing in the band buffer 110 by the expansion section 109 will be discussed. This operation consists of an intermediate code input phase for storing all entries of a drawing page in the intermediate buffer 106 and an intermediate code output phase for outputting and drawing all the entries stored in the intermediate buffer 106. The phases will be discussed below separately:

1: Intermediate code input phase

First, in the intermediate code input phase, when print data 100 is input, it is interpreted by the instruction interpretation analysis section 102, then is converted into intermediate code by the intermediate code preparation section 105 and the intermediate code is stored in the intermediate buffer 106. That is, graphic entries are prepared from drawing information and proper attribute information and common attribute information is common attribute entries. All the graphic entries are stored in the intermediate buffer 106; whether or not each common attribute entry changes from the preceding value is determined by the common attribute information extraction section 103, and only when the common attribute entry changes from the preceding value, it is stored in the intermediate buffer 106. To cover band division, mapping information of management information to determine which band each entry belongs to is added to the entry. That is, mapping information indicating the band where the graphic form is drawn is added to the graphic entry and mapping information indicating information concerning all bands is added to the common attribute entry.

On the other hand, the common attribute information initial value storage section 104 stores the initial values of common attribute information specified at the top of the page of the print data.

After all entries of one page are thus stored in the intermediate buffer 106, the transition to the intermediate code output phase is made.

2: Intermediate code output phase

Next, in the intermediate code output phase, first the common attribute information initial value setting section 107 sets the initial values of common attribute information stored in the common attribute information initial value storage section 104 as initial common attribute information. The entries related to the first band are read in sequence from the intermediate buffer 106 and are expanded in the band buffer 110 by the expansion section 109. Meanwhile, if a new attribute value is specified in a common attribute entry, common attribute information setting is updated to the new value by the common attribute information restoration section 108.

When the entries related to the first band are thus expanded into bit map data in the band buffer 110, the bit map data is transferred to the image formation section 111, which then prints out an image based on the bit map data. On the other hand, the common attribute information initial value setting section 107 reads the initial values of common attribute information stored in the common attribute information initial value storage section 104 and again sets the values from the beginning and expansion of the second band is started. Processing similar to that described above is performed for the subsequent bands and expansion is executed in sequence for the bands, whereby a common attribute information mismatch caused by banding is avoided.

The operation assumes that all entries of one page can be stored in the intermediate buffer 106. If not all entries of one page can be stored in the intermediate buffer 106, namely, the intermediate buffer 106 overflows, the entries that can be stored are stored in the intermediate buffer 106 as a temporary measure and each band is drawn in the band buffer 110 by the expansion section 109. In this case, the bit map data of each band is compressed, then saved in another compressed data storage area so as to prevent the preceding band from being overwritten as the following band is drawn in the band buffer 110.

At the termination of expansion of all bands, the remaining overflow entries are stored in the intermediate buffer 106 from the top thereof and each band is expanded by the expansion section 109 and the resultant data is merged with the previous data temporarily saved in the band buffer 110. That is, when the remaining data of each band is expanded, the compressed and saved data of the corresponding band is decompressed and again expanded in the band buffer 110 and merged with the remaining data.

To later expand some of the 1-page entries overflowing from the intermediate buffer 106, the common attribute information values written into the intermediate buffer 106 just before the intermediate buffer 106 overflows are stored in the common attribute information initial value storage section 104 and when entry expansion for each band of overflow data is started, the values are set as the initial values of common attribute information, whereby a common attribute information mismatch is avoided.

(3) Details of Operation

Next, the operation of the embodiment will be discussed in detail with reference to flowcharts shown in FIGS. 18 to 20.

Figure 18:
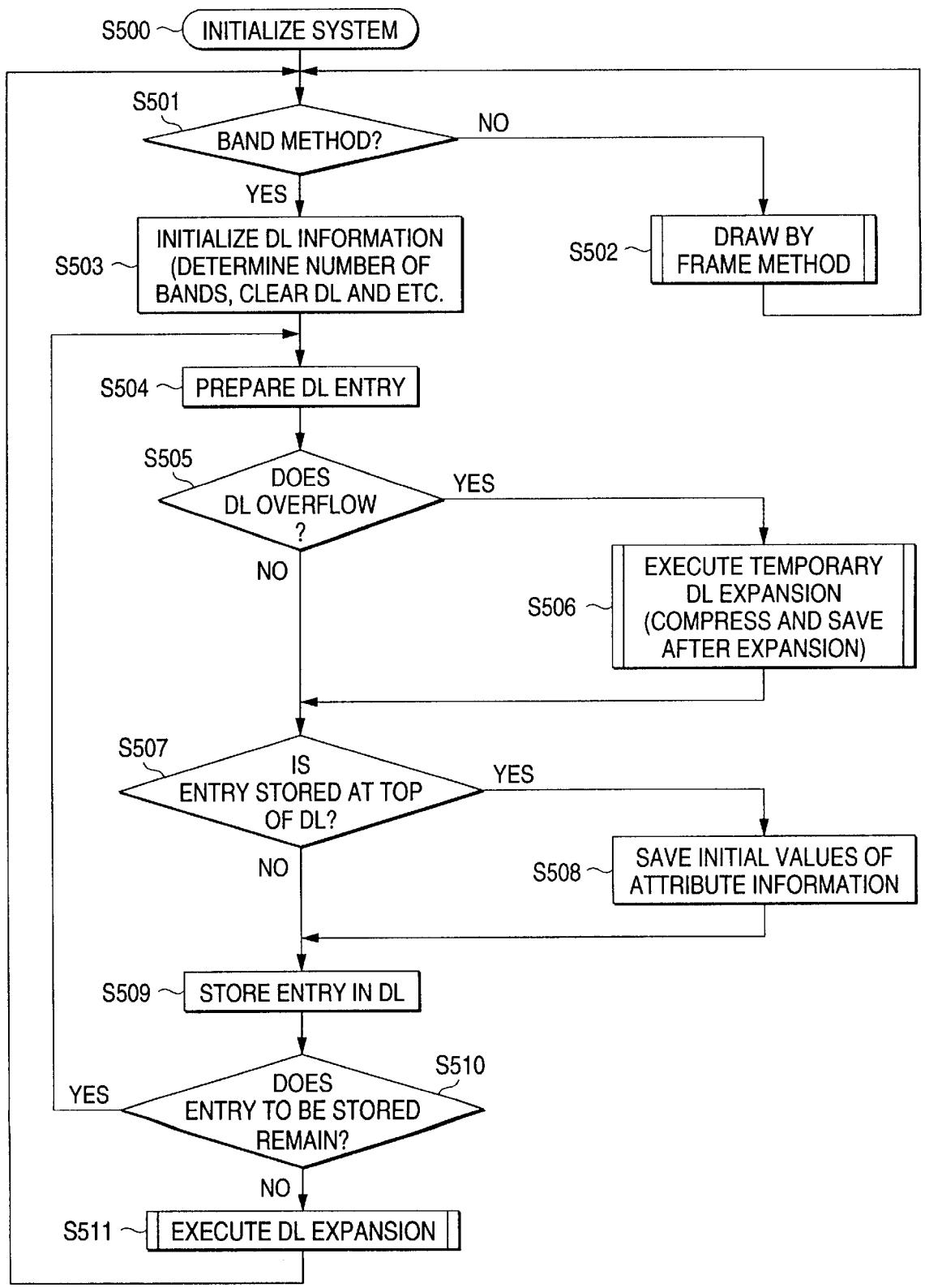
FIG. 18 is a flowchart to show a main routine of a control program executed by a CPU in the third embodiment of the invention.

FIG. 18 is a flowchart to show a main routine of a control program executed by the CPU; it mainly shows the drawing processing contents by the banding method. In the figure, first when power is turned on, the system is initialized at step S500. When print data is supplied through a predetermined input interface, which of the frame method and the band method is to be used for drawing is determined based on the page size, etc., at step S501. If it is determined that the frame method can be used for drawing because the page size is small, etc., drawing is executed by the frame method at step S502. A known drawing method is assumed to be adopted for the drawing by the frame method, which will not be discussed here. On the other hand, if it is determined that the banding method needs to be used for drawing because the page size is large, etc., the following process (steps S503–S511) is executed:

First, before expansion of each page, information concerning storage in the intermediate buffer 106 such as the number of band divisions is initialized at step S503. DL described in the flowcharts is an abbreviation for display list and means the intermediate buffer 106. The supplied print data is interpreted and an entry to be stored in the intermediate buffer 106 is prepared at step S504. Next, whether or not the intermediate buffer 106 overflows is determined at step S505. If the intermediate buffer 106 overflows, control goes to step S506 for executing a temporary expansion process in the intermediate buffer 106. The temporary expansion process is described later. On the other hand, if the intermediate buffer 106 does not overflow, the following process (steps S507–S511) is executed to store the prepared entry in the intermediate buffer 106.

First, whether or not the entry is to be stored at the top of the intermediate buffer 106, namely, the top of the page is determined at step S507. Only if it is determined that the entry is stored at the top, the initial values of common attribute information are stored by the common attribute information initial value storage section 104 at step S508. Next, the entry is stored in the intermediate buffer 106 at step S509. Whether all entries of the page have been stored in the intermediate buffer 106 is determined at step S510. If it is determined that all entries of the page have been stored, control goes to step S511 for executing an expansion process in the intermediate buffer 106.

Figure 19:
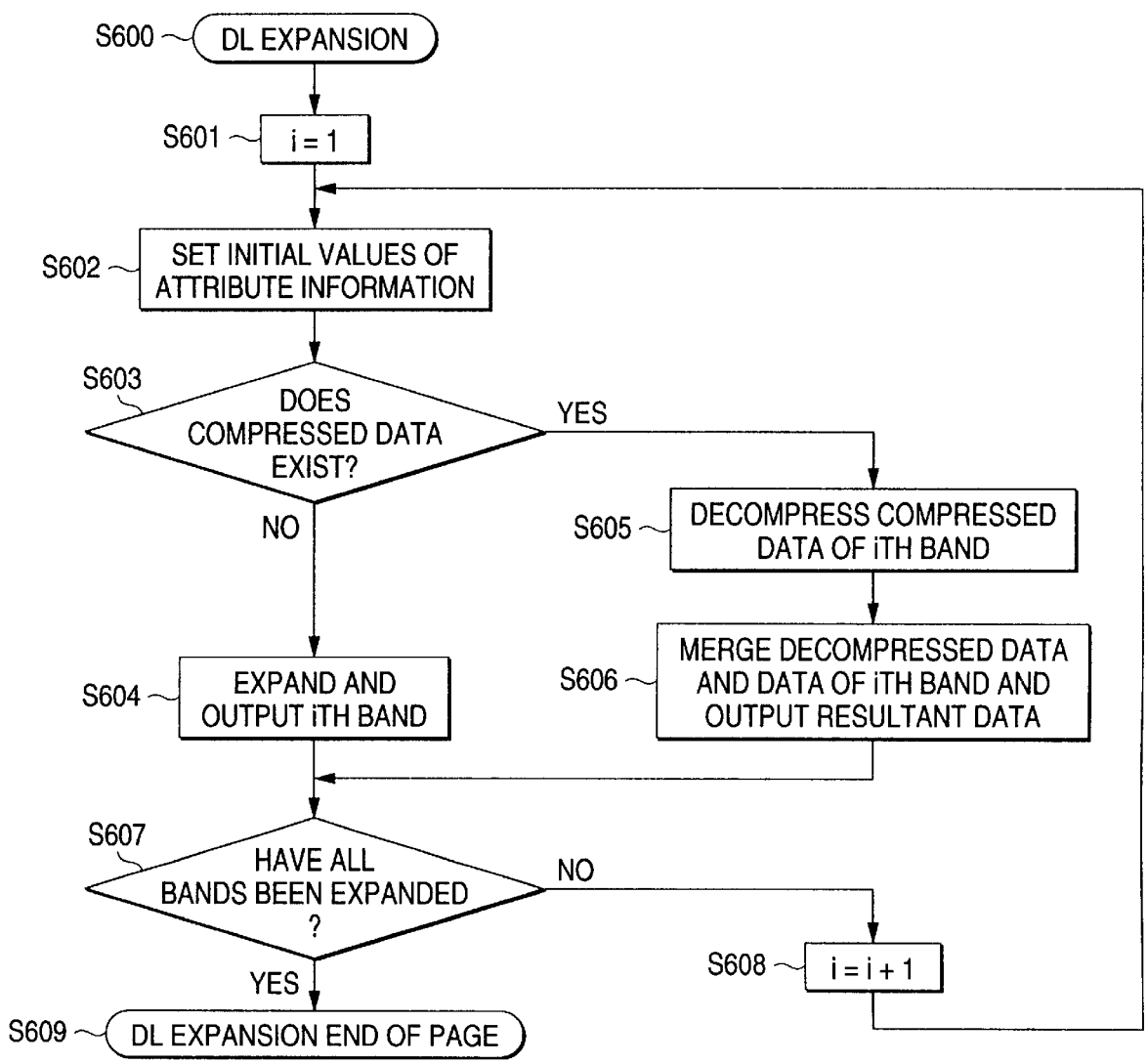
FIG. 19 is a flowchart to show an expansion process subroutine of the control program executed by the CPU in the third embodiment of the invention.

FIG. 19 is a flowchart to show a subroutine executed at step S551; it shows the expansion process contents in the intermediate buffer 106.

In FIG. 19, when the expansion process in the intermediate buffer 106 is started at step S600, first a loop counter is initialized to expand data in order starting at the first band at step S601. The initial values of common attribute information stored in the common attribute information initial value storage section 104 are set at step S602. Next, whether or not compressed and saved data exists is determined at step S603. This assumes that the intermediate buffer 106 already overflows. If compressed and saved data exists, it is decompressed at step S605, then the entries of the band are expanded and merged with the decompressed data and the resultant data is sent to the image formation section 111 at step S606.

On the other hand, if compressed and saved data does not exist, steps S605 and S606 are skipped, the entries of the band are expanded, and the resultant data is sent to the image formation section 111 at step S604.

While the loop counter is incremented thus from the first band to the last band at step S608, the loop of steps S602–S608 is executed repeatedly until completion of expansion of all bands. Upon completion of the expansion of all bands, control exits from the subroutine at step S609.

Figure 20:
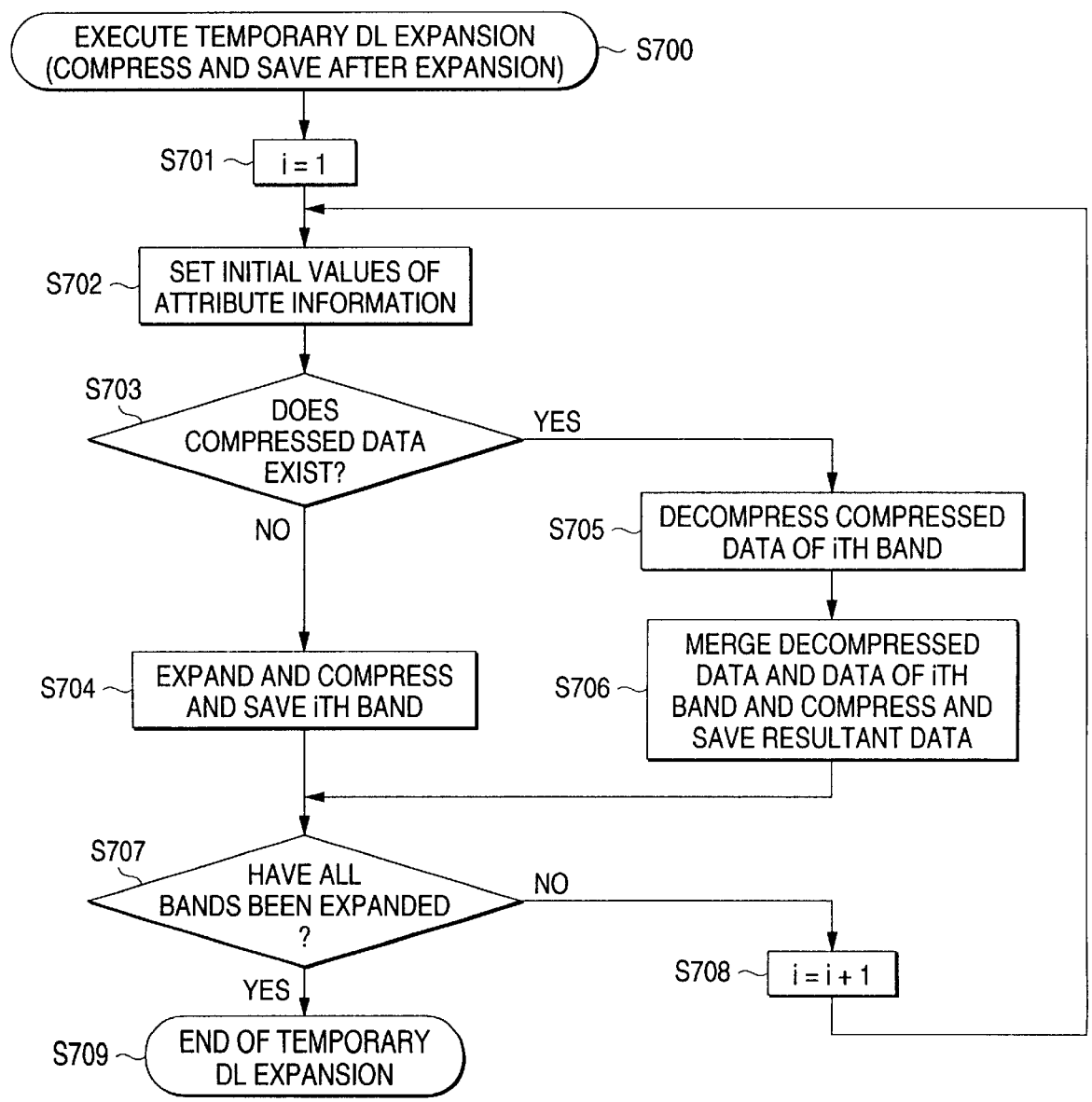
FIG. 20 is a flowchart to show a temporary expansion process subroutine of the control program executed by the CPU in the third embodiment of the invention.

FIG. 20 is a flowchart to show a subroutine executed at step S506 (see FIG. 18); it shows the temporary expansion process contents executed when the intermediate buffer 106 overflows.

In FIG. 20, when the temporary expansion process in the intermediate buffer 106 is started at step S700, first a loop counter is initialized to execute temporary expansion in order starting at the first band at step S701. The initial values of common attribute information stored in the common attribute information initial value storage section 104 are set at step S702. In this case, the initial values of common attribute information refer to the common attribute information written into the intermediate buffer 106 just before the intermediate buffer 106 overflows rather than the common attribute information specified at the beginning of the page. Next, whether or not compressed and saved data exists is determined at step S703. This assumes that the intermediate buffer 106 already overflows before the current overflow. If compressed and saved data exists, it is decompressed at step S705, then the entries of the band are expanded and merged with the decompressed data and the resultant data is compressed and saved at step S706. The resultant data is not sent to the image formation section 111 to wait for expanding the remaining data causing the current overflow.

On the other hand, if compressed and saved data does not exist, steps S705 and S706 are skipped, the entries of the band are expanded, and the resultant data is compressed and saved at step S704. The resultant data is not sent either to the image formation section 111 to wait for expanding the remaining data causing the current overflow.

While the loop counter is incremented thus from the first band to the last band at step S708, the loop of steps S702–S708 is executed repeatedly until completion of temporary expansion of all bands. Upon completion of the temporary expansion of all bands, control exits from the subroutine at step S709.

(4) Effects

Thus, according to the embodiment, in expansion into bit map data by the banding method, when common attribute information is stored in the intermediate buffer 106 only if the value of the common attribute information is changed in order to decrease the intermediate code amount, a mismatch problem of common attribute information different from the original value at the expansion start time of each band does not occur.

If one page of intermediate code overflows from the intermediate buffer 106 and expansion processing is executed more than once to expand the 1-page intermediate code, the mismatch problem does not occur either.

Fourth Embodiment

Next, a fourth embodiment of the invention will be discussed. The fourth embodiment differs from the third embodiment only in that initial values of common attribute information are stored in a given area starting at the top of an intermediate buffer 106 without providing the common attribute information initial value storage section 104 in the third embodiment.

In an intermediate code input phase, to store entries prepared by an intermediate code preparation section 105 in the intermediate buffer 106 starting at the top thereof, first the initial values of common attribute information are stored at the top of the intermediate buffer 106 and the entries are stored in sequence following the initial values. This means that the initial values of common attribute information are always stored in the top area of the intermediate buffer 106.

On the other hand, in an intermediate code output phase, an expansion section 109 can inevitably read the initial values of common attribute information simply by accessing the intermediate buffer 106 starting at the top thereof, eliminating the need for making special memory access to set the initial values of common attribute information as in the third embodiment.

If the intermediate buffer 106 overflows and entries of one page are divided into two or more groups for storage, the common attribute information entered just before the intermediate buffer 106 overflows is stored at the top of the intermediate buffer 106, thereby eliminating the need for special memory access to set the initial values of common attribute information.

The initial values of common attribute information are thus stored at the top of the intermediate buffer 106 regardless of whether or not the intermediate buffer 106 overflows, whereby the process of setting the initial values of common attribute information before each band is drawn is contained in the operation of the expansion section 109 starting access to the intermediate buffer 106 at the top thereof; processing is simplified.

Modified Embodiments

The invention is not limited to the above-described embodiments and the following modifications are possible:

(1) For example, in the embodiment, attendant print data for each drawing information piece is supplied independently of whether or not the common attribute information changes, but the invention is not limited to the form and is also applicable to a case where print data is supplied in the form of removing or thinning out the common attribute information not changing from the preceding value. In this case, the common attribute information extraction section 103 can be omitted.

(2) If the intermediate buffer 106 has a sufficient capacity and there is no possibility that the intermediate buffer 106 will overflow, as the process to avoid a common attribute information mismatch, the common attribute information specified first at the top of each page needs only to be stored as initial values and set at the expansion time; the measure taken when the intermediate buffer 106 overflows becomes unnecessary.

(3) In the embodiments, the invention is applied to a printer, but can also be applied to other image output units, such as image display units of display units, etc.

(4) The invention is embodied as the drawing system built in the printer, but can also be understood as a drawing method for causing the printer to operate as in the embodiments and can be formed as a program for causing the printer control microcomputer to execute the processing procedures of the embodiments. The program can also be recorded on a recording medium such as floppy disk so that it is portable to another system.

As we have discussed, according to the invention, the attribute information can be thinned out for decreasing the intermediate code amount without involving an attribute information mismatch to divide one page into bands and expand in the drawing memory as bit map data by the banding method.

What is claimed is:

1. An image processing system comprising:

number-of-divisions determination means for determining how many bands one page is to be divided into, conversion means for converting code data of at least one page into intermediate code, an intermediate buffer for storing the intermediate code, selection means for selecting the intermediate code corresponding to a specific band out of said intermediate buffer, expansion means for expanding the intermediate code to bit map data, and a band memory for storing the resultant bit map data, wherein area information addition means for adding area information indicating which band the code is valid on to the intermediate code;

intermediate code determination means for determining whether or not elements of the preceding intermediate code differ from the corresponding elements of the subsequent intermediate code;

control means for storing the corresponding elements of the subsequent intermediate code in said intermediate buffer if said intermediate code determination means determines that the elements of the preceding intermediate code differ from the corresponding elements of the subsequent intermediate code; and restoration means for restoring the subsequent intermediate code using the preceding intermediate code when the intermediate code is output from said intermediate buffer to said expansion means.

2. The image processing system of claim 1, further comprising:

separation means for separating the elements of the intermediate code into proper information and attribute information, wherein said area information addition means adds area information indicating which band the code is valid on to the proper information and attribute information of the intermediate code.

3. The image processing system of claim 1, further comprising:

separation means for separating the elements of the intermediate code into proper information and attribute information, wherein said area information addition means adds area information indicating which band the code is valid on to the proper information to the intermediate code.

4. An image processing system comprising:

number-of-divisions determination means for determining how many bands one page is to be divided into;

conversion means, when converting code data of at least one page into intermediate code, for adding area information indicating which band the code is valid on;

an intermediate buffer for storing the intermediate code;

selection means for selecting the intermediate code corresponding to a specific band out of said intermediate buffer based on the area information added by said conversion means;

expansion means for expanding the intermediate code to bit map data; and a band memory for storing the resultant bit map data.

5. An image processing system comprising:

number-of-divisions determination means for determining how many bands one page is to be divided into;

conversion means for converting code data of at least one page into intermediate code;

an intermediate buffer for storing the intermediate code;

selection means for selecting the intermediate code corresponding to a specific band out of said intermediate buffer;

expansion means for expanding the intermediate code to bit map data; and a band memory for storing the resultant bit map data, wherein said conversion means comprises:

intermediate code determination means for determining whether or not elements of the preceding intermediate code differ from the corresponding elements of the subsequent intermediate code; and control means for storing the corresponding elements of the subsequent intermediate code in said intermediate buffer if said intermediate code determination means determines that the elements of the preceding intermediate code differ from the corresponding elements of the subsequent intermediate code, and wherein said expansion means restores the subsequent intermediate code using the preceding intermediate code and expands the restored intermediate code.

6. An image processing system comprising:

number-of-divisions determination means for determining how many bands one page is to be divided into, conversion means for converting code data of at least one page into intermediate code, an intermediate buffer for storing the intermediate code, selection means for selecting the intermediate code corresponding to a specific band out of said intermediate buffer, expansion means for expanding the intermediate code to bit map data, and a band memory for storing the resultant bit map data, said image processing system comprising:

intermediate code preparation means for inserting management information to divide a page image into bands for expansion into input code data and preparing intermediate code;

an intermediate buffer that can be accessed at random for storing the intermediate code prepared by said intermediate code preparation means;

storage means for storing initial values of attribute information specified at the beginning of a page in the code data;

expansion means for reading the intermediate code from said intermediate buffer for each band and expanding partial images of the first band to the nth band (n is an integer of 2 or more) in sequence in the drawing memory based on the drawing information and the attribute information; and attribute information specification means for specifying the initial values of attribute information stored in said storage means in said expansion means when said expansion means starts expansion at the top of each band.

7. The image processing system of claim 6, further comprising:

control means, if a code amount of the intermediate code exceeds a capacity of said intermediate buffer, for controlling so that the data of the portion written into said intermediate buffer is previously expanded in the drawing memory by said expansion means, then remaining overflow data is written into said intermediate buffer and is expanded in the drawing memory by said expansion means and is merged with the portion previously expanded in the drawing memory;

second storage means for storing attribute information specified just before said intermediate buffer overflows when said intermediate buffer overflows; and second attribute information specification means for specifying the attribute information stored in said second storage means in said expansion means when said expansion means starts expansion at the top of the overflow data written into said intermediate buffer.

8. The image processing system of claim 6, further comprising:

removal means for inputting code data containing attribute information for each drawing information piece regardless of whether or not the attribute changes, detects the presence or absence of attribute change from the code data, and removing attribute information specifying an attribute not changing from the preceding attribute from the code data.

9. The image processing system of claim 6, wherein the storage area of said storage means is set in the top area where access to said intermediate buffer is started.

10. The image processing system of claim 7, wherein the storage areas of said storage means and said second storage means are set in the top area where access to said intermediate buffer is started.

11. The image processing system of claim 6 comprising:

a first operation mode of drawing by a frame method for each page;

a second operation mode of dividing one page into bands and drawing by a banding method; and switch means for determining which of the first and second operation modes is to be used for drawing.

12. The image processing system of claim 6, further comprising the steps of:

if a code amount of the intermediate code exceeds a capacity of said intermediate buffer, previously expanding the data of the portion written into said intermediate buffer in the drawing memory, then writing remaining overflow data into said intermediate buffer, expanding the data in the drawing memory, and merging the data with the portion previously expanded in the drawing memory;

storing attribute information specified just before said intermediate buffer overflows in second storage means when said intermediate buffer overflows; and specifying the attribute information stored in said second storage means as initial values when expansion is started at the top of the overflow data written into said intermediate buffer.

13. A printer comprising:

said image processing system of claim 6 for printing out an image corresponding to the bit map data expanded in the drawing memory.

14. A image processing method for converting code data of a page image consisting of drawing information at least giving a drawing instruction and attribute information specifying a new attribute after change only if an attribute of the drawing information changes into bit map data and expanding in a drawing memory, said drawing method comprising the steps of:

inserting management information to divide a page image into bands for expansion into input code data and preparing intermediate code;

storing initial values of attribute information specified at the beginning of a page in the code data in predetermined storage means;

storing the prepared intermediate code in an intermediate buffer that can be accessed at random;

reading the intermediate code from said intermediate buffer for each band and expanding partial images of the first band to the nth band in sequence in the drawing memory based on the drawing information and the attribute information; and specifying the initial values of attribute information stored in said storage means when expansion is started at the top of each band.

15. A medium for recording a program to cause a computer to execute a procedure of converting code data of a page image consisting of drawing information at least giving a drawing instruction and attribute information specifying a new attribute after change only if an attribute of the drawing information changes into bit map data and expanding in a drawing memory, said medium for recording said program to cause the computer to execute the steps of:

inserting management information to divide a page image into bands for expansion into input code data and preparing intermediate code;

storing initial values of attribute information specified at the beginning of a page in the code data in predetermined storage means;

storing the prepared intermediate code in an intermediate buffer that can be accessed at random;

reading the intermediate code from said intermediate buffer for each band and expanding partial images of the first band to the nth band in sequence in the drawing memory based on the drawing information and the attribute information; and specifying the initial values of attribute information stored in said storage means when expansion is started at the top of each band.

16. The medium of claim 15 for recording said program to cause the computer to further execute the steps of:

if a code amount of the intermediate code exceeds a capacity of said intermediate buffer, previously expanding the data of the portion written into said intermediate buffer in the drawing memory, then writing remaining overflow data into said intermediate buffer, expanding the data in the drawing memory, and merging the data with the portion previously expanded in the drawing memory;

storing attribute information specified just before said intermediate buffer overflows in second storage means when said intermediate buffer overflows; and specifying the attribute information stored in said second storage means as initial values when expansion is started at the top of the overflow data written into said intermediate buffer.

17. An image display unit comprising:

said image processing system of claim 6 for displaying an image corresponding to the bit map data expanded in the drawing memory.

18. A drawing system for converting code data of a page image consisting of drawing information at least giving a drawing instruction and attribute information specifying a new attribute after change only if an attribute of the drawing information changes into bit map data and expanding in a drawing memory, said drawing system comprising:

intermediate code preparation means for inserting management information to divide a page image into bands for expansion into input code data and preparing intermediate code;

an intermediate buffer that can be accessed at random for storing the intermediate code prepared by said intermediate code preparation means;

storage means for storing initial values of attribute information specified at the beginning of a page in the code data;

expansion means for reading the intermediate code from said intermediate buffer for each band and expanding partial images of the first band to the nth band (n is an integer of 2 or more) in sequence in the drawing memory based on the drawing information and the attribute information; and attribute information specification means for specifying the initial values of attribute information stored in said storage means in said expansion means when said expansion means starts expansion at the top of each band.

19. The drawing system of claim 18, further comprising:

control means, if a code amount of the intermediate code exceeds a capacity of said intermediate buffer, for controlling so that the data of the portion written into said intermediate buffer is previously expanded in the drawing memory by said expansion means, then remaining overflow data is written into said intermediate buffer and is expanded in the drawing memory by said expansion means and is merged with the portion previously expanded in the drawing memory;

second storage means for storing attribute information specified just before said intermediate buffer overflows when said intermediate buffer overflows; and second attribute information specification means for specifying the attribute information stored in said second storage means in said expansion means when said expansion means starts expansion at the top of the overflow data written into said intermediate buffer.

20. The drawing system of claim 18, further comprising:

removal means for inputting code data containing attribute information for each drawing information piece regardless of whether or not the attribute changes, detects the presence or absence of attribute change from the code data, and removing attribute information specifying an attribute not changing from the preceding attribute from the code data.

21. The drawing system of claim 18, wherein the storage area of said storage means is set in the top area where access to said intermediate buffer is started.

22. The drawing system of claim 19, wherein the storage areas of said storage means and said second storage means are set in the top area where access to said intermediate buffer is started.

23. The drawing system of claim 18 comprising:
- a first operation mode of drawing by a frame method for each page;
- a second operation mode of dividing one page into bands and drawing by a banding method; and
- switch means for determining which of the first and second operation modes is to be used for drawing.

24. The drawing system of claim 18, further comprising the steps of:
- if a code amount of the intermediate code exceeds a capacity of said intermediate buffer, previously expanding the data of the portion written into said intermediate buffer in the drawing memory, then writing remaining overflow data into said intermediate buffer, expanding the data in the drawing memory, and merging the data with the portion previously expanded in the drawing memory;
- storing attribute information specified just before said intermediate buffer overflows in second storage means when said intermediate buffer overflows; and
- specifying the attribute information stored in said second storage means as initial values when expansion is started at the top of the overflow data written into said intermediate buffer.

25. A printer comprising:
- a drawing system of claim 18 for printing out an image corresponding to the bit map data expanded in the drawing memory.

26. An image display unit comprising:
- a drawing system of claim 18 for displaying an image corresponding to the bit map data expanded in the drawing memory.

27. A drawing method for converting code data of a page image consisting of drawing information at least giving a drawing instruction and attribute information specifying a new attribute after change only if an attribute of the drawing information changes into bit map data and expanding in a drawing memory, said drawing method comprising the steps of:
- inserting management information to divide a page image into bands for expansion into input code data and preparing intermediate code;
- storing initial values of attribute information specified at the beginning of a page in the code data in predetermined storage means;
- storing the prepared intermediate code in an intermediate buffer that can be accessed at random;
- reading the intermediate code from said intermediate buffer for each band and expanding partial images of the first band to the nth band in sequence in the drawing memory based on the drawing information and the attribute information; and
- specifying the initial values of attribute information stored in said storage means when expansion is started at the top of each band.

28. A medium for recording a program to cause a computer to execute a procedure of converting code data of a page image consisting of drawing information at least giving a drawing instruction and attribute information specifying a new attribute after change only if an attribute of the drawing information changes into bit map data and expanding in a drawing memory, said medium for recording said program to cause the computer to execute the steps of:
- inserting management information to divide a page image into bands for expansion into input code data and preparing intermediate code;
- storing initial values of attribute information specified at the beginning of a page in the code data in predetermined storage means;
- storing the prepared intermediate code in an intermediate buffer that can be accessed at random;
- reading the intermediate code from said intermediate buffer for each band and expanding partial images of the first band to the nth band in sequence in the drawing memory based on the drawing information and the attribute information; and
- specifying the initial values of attribute information stored in said storage means when expansion is started at the top of each band.

29. The medium of claim 28 for recording said program to cause the computer to further execute the steps of:
- if a code amount of the intermediate code exceeds a capacity of said intermediate buffer, previously expanding the data of the portion written into said intermediate buffer in the drawing memory, then writing remaining overflow data into said intermediate buffer, expanding the data in the drawing memory, and merging the data with the portion previously expanded in the drawing memory;
- storing attribute information specified just before said intermediate buffer overflows in second storage means when said intermediate buffer overflows; and
- specifying the attribute information stored in said second storage means as initial values when expansion is started at the top of the overflow data written into said intermediate buffer.

* * * * *